(12) United States Patent
Nam

(10) Patent No.: US 8,955,028 B2
(45) Date of Patent: Feb. 10, 2015

(54) SYSTEM FOR INTERFACING EXTERNAL DATA TO IPTV AND METHOD OF THE SAME

(76) Inventor: Ki-Won Nam, Seoul (KR)

( * ) Notice: Subject to any disclaimer, the term of this patent is extended or adjusted under 35 U.S.C. 154(b) by 974 days.

(21) Appl. No.: 12/819,559

(22) Filed: Jun. 21, 2010

(65) Prior Publication Data

US 2010/0257549 A1  Oct. 7, 2010

Related U.S. Application Data

(63) Continuation-in-part of application No. PCT/KR2008/007558, filed on Dec. 19, 2008.

(30) Foreign Application Priority Data

Dec. 21, 2007 (KR) .................. 10-2007-0135359

(51) Int. Cl.
| | |
|---|---|
| H04N 7/16 | (2011.01) |
| H04H 60/32 | (2008.01) |
| G06F 3/00 | (2006.01) |
| H04N 7/18 | (2006.01) |
| H04N 5/775 | (2006.01) |
| H04N 7/173 | (2011.01) |

(Continued)

(52) U.S. Cl.
CPC .............. *H04N 5/775* (2013.01); *H04N 7/173* (2013.01); *H04N 21/25816* (2013.01); *H04N 21/25875* (2013.01); *H04N 21/4126* (2013.01); *H04N 21/4227* (2013.01); *H04N 21/6125* (2013.01); *H04N 21/64707* (2013.01); *H04N 21/812* (2013.01); *H04N 5/765* (2013.01)
USPC .................. 725/131; 725/25; 725/62; 725/80

(58) Field of Classification Search
None
See application file for complete search history.

(56) References Cited

U.S. PATENT DOCUMENTS

2007/0121584 A1* 5/2007 Qiu et al. ...................... 370/352
2007/0209065 A1    9/2007 Branam et al.

(Continued)

FOREIGN PATENT DOCUMENTS

KR    10-2005-0057745 A    6/2005

OTHER PUBLICATIONS

International Search Report issued on Jun. 30, 2009 in International Application No. PCT/KR2008/007558.

*Primary Examiner* — Brian T Pendleton
*Assistant Examiner* — Jean D Saint Cyr
(74) *Attorney, Agent, or Firm* — Novick, Kim & Lee, PLLC; Jae Youn Kim

(57) ABSTRACT

A system for interfacing external data to IPTV and a method of the same are provided, which register unique numbers of mobile phones, other data communication devices and IPTVs in conjunction with an external data transmission server in advance and have an SMS server, a mobile communication company's server and a mail server and external data transmission server linked with one another, and which transmits at least one of text, moving image data, and still image data to a desired mobile phone or IPTV according to user's setting for its output. This present invention can interface external data received by various data communication devices such as a mobile phone, an email server, and a mobile communication company's server to IPTV for its output onto the screen according user's setting, and establishes an output time of the external data in advance by a user to output it at a time of high concentration.

6 Claims, 17 Drawing Sheets

(51) Int. Cl.
*H04N 21/258* (2011.01)
*H04N 21/41* (2011.01)
*H04N 21/4227* (2011.01)
*H04N 21/61* (2011.01)
*H04N 21/647* (2011.01)
*H04N 21/81* (2011.01)
*H04N 5/765* (2006.01)

(56) References Cited

U.S. PATENT DOCUMENTS

2007/0242659 A1   10/2007   Cantu et al.
2008/0271091 A1*  10/2008   White ............................. 725/68
2010/0017816 A1*   1/2010   Martini et al. ................. 725/31

* cited by examiner

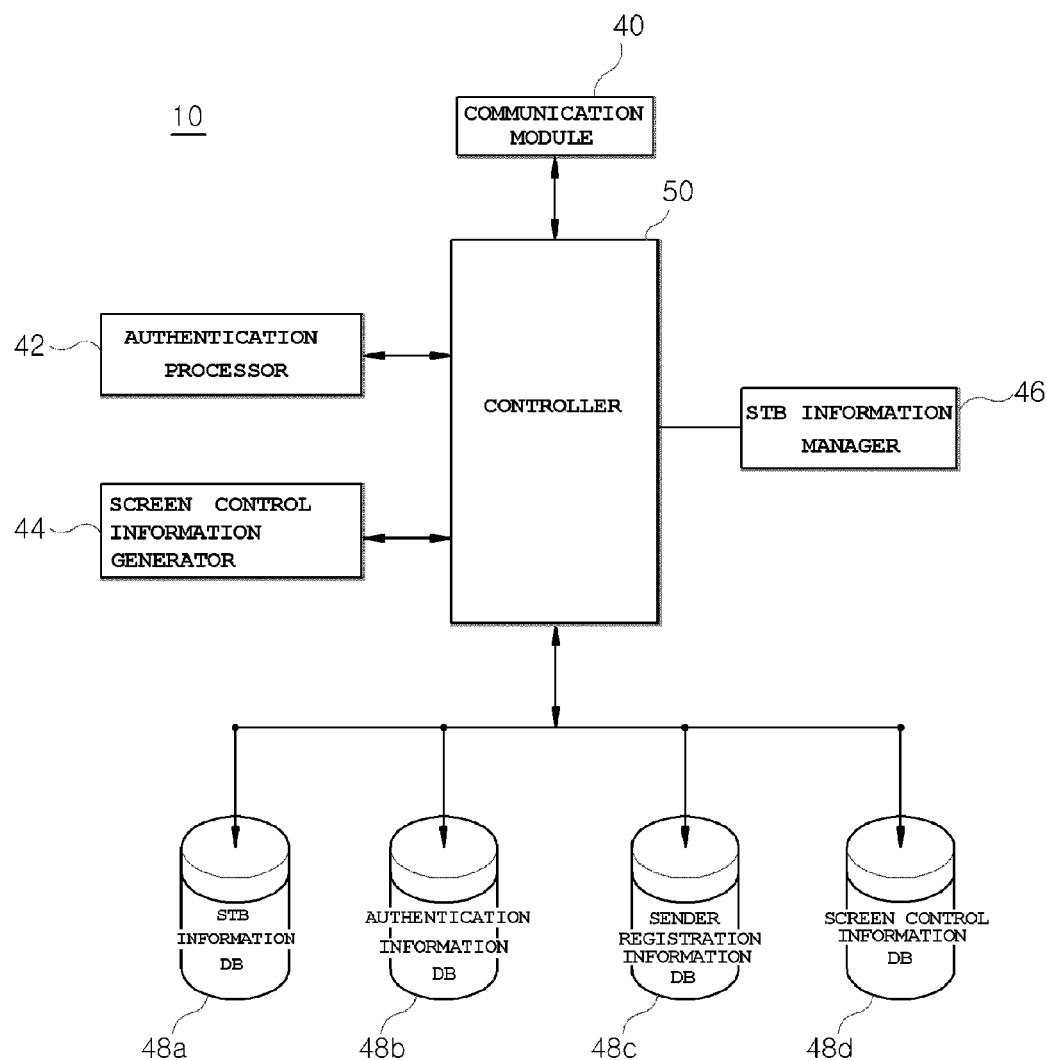

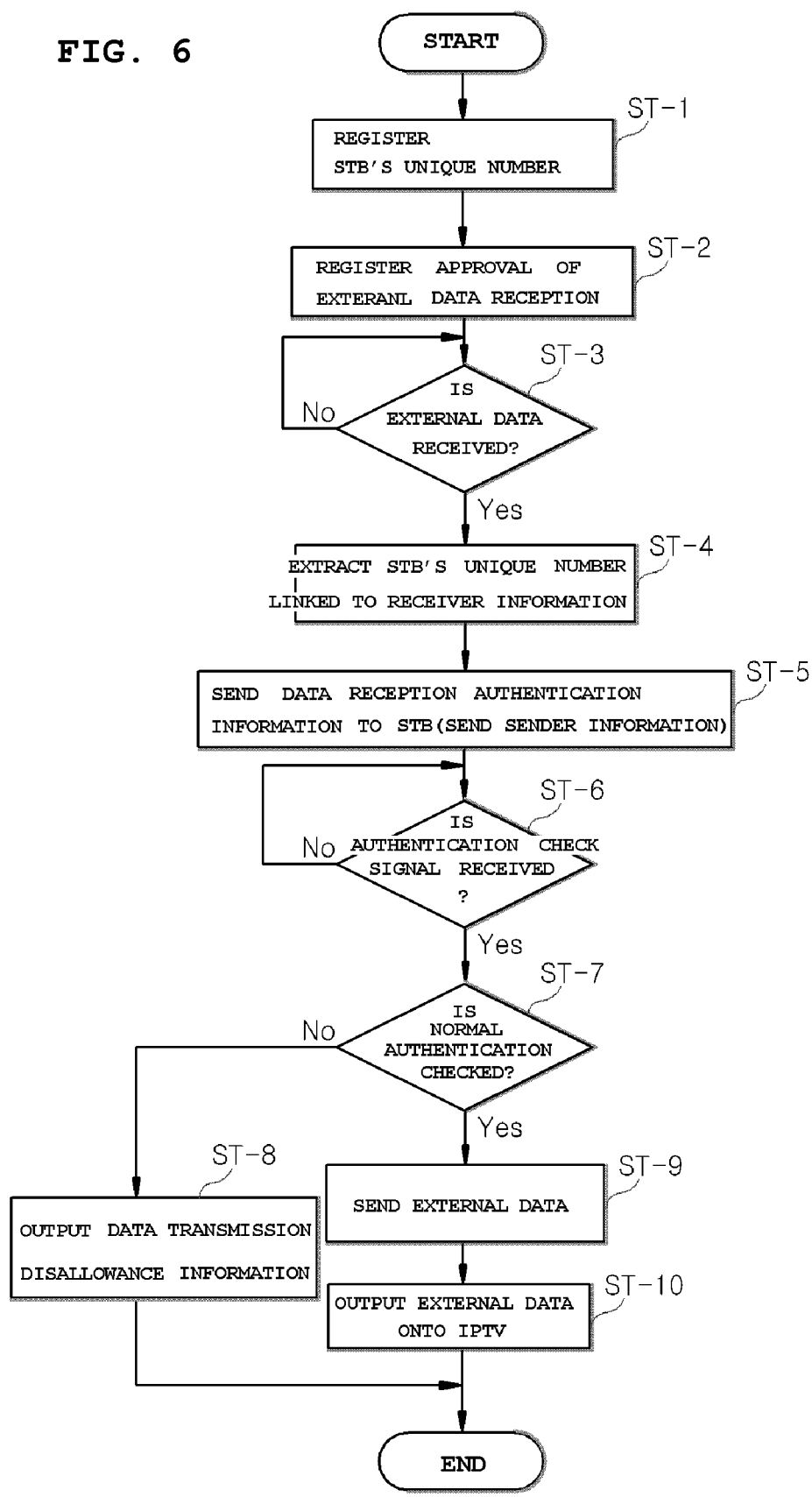

SYSTEM FOR INTERFACING EXTERNAL DATA TO IPTV AND METHOD OF THE SAME

CROSS-REFERENCE TO RELATED APPLICATIONS

This application is a continuation-in-part of international application No. PCT/KR2008/007558, filed on Dec. 19, 2008, and claims priority under 35 U.S.C. §119 to Korean Patent Application No. 10-2007-0135359, filed on Dec. 21, 2007 in the Korean Intellectual Property Office, the disclosure of which are incorporated herein by reference in their entirety.

TECHNICAL FIELD

The present invention relates to a system for interfacing external data to IPTV and a method of the same, and more particularly, to a system for interfacing external data to IPTV, which registers unique numbers of mobile phones, other data communication devices and IPTVs in conjunction with an external data transmission server in advance and has an SMS server, a mobile communication company's server, a mobile communication company's server and mail server and external data transmission server linked to one another, and which transmits at least one of text, moving image data and still image data to a desired mobile phone or IPTV depending on user's setting for its output, and a method of the same.

BACKGROUND ART

With the recent advance of information communication technology, studies are actively in progress for a development of information providing technology which provides information about various fields to plural subscribers in real time through at least one host server over a remote data communication network.

Based on the above, examples of external data capable of being outputted onto screens with which users are in contact in their life include broadcast data provided through TV, text data and moving image data or still image data outputted through mobile phones, and various kinds of data provided through computer terminals.

For mobile phones, however, since theirs monitors are very small, the prime of the manhood and older people often may not accurately identify text data, moving image data, or still data by their reduced sight when it is outputted onto the screen. Even if the sight is good, the monitors of mobile phones make viewers inconvenient for small size.

In addition, if a mobile phone is in vibration mode when its owner takes a rest in home, he or she does not frequently confirm whether various external data including text data is received by the phone. Thus, in most cases, he or she often watches TV with the mobile phone nearby, even upon watching TV in the night.

Moreover, the mobile phone has a function of informing its owner of a specific memorial day, such as wedding anniversary or family's birthday, by an alarm when its related day arrives after setting. In this case, all of family do not recognize the related memorial day, but only the phone's owner can recognize it. Even the phone's owner often forgets the memorial day since that date.

DISCLOSURE

Technical Problem

The present invention has been made in view of the above problems of the prior arts, and it is, therefore, a primary object of the present invention to provide a system for interfacing external data to IPTV, which registers unique numbers of mobile phones, other data communication devices and IPTVs in conjunction with an external data transmission server in advance and has an SMS server, a mobile communication company's server and a mail server and external data transmission server linked to one another, and which transmits at least one of text, moving image data and still image data to a desired mobile phone or IPTV depending on user's setting for its output, and a method of the same.

It is another object of the present invention to provide a system for interfacing external data to IPTV, which registers unique numbers of mobile phones and IPTVs in conjunction with an external data transmission server in advance and has an SMS server, mobile communication company's server and an external data transmission server linked with one another, and which judges whether sender's information has been previously registered and, if it is pre-registered sender's data, performs no additional authentication procedure and outputs received data onto a monitor of IPTV and, if it is related to a non-registered sender, performs an additional authentication procedure, and a method of the same.

It is still another object of the present invention to provide a system for interfacing external data to IPTV, which sets up received external data so that it is to be outputted in real time when a power turn-on or turn-off signal is received from a remocon of IPTV depending on user's setting and controls the output of the external data based on the setup data, and a method of the same.

It is still another object of the present invention to provide a system for interfacing external data to IPTV, which registers unique numbers of mobile phones and IPTVs in conjunction with an external data transmission server in advance and has an SMS server, a mobile communication company's server and an external data transmission server linked to one another, and which transmits text, moving image data, or still image data to a desired mobile phone or IPTV depending on user's setting for its output and makes an automatic recording on broadcast data through PVR during an output time of the corresponding data, and a method of the same.

It is still another object of the present invention to provide a system for interfacing external data to IPTV, which automatically reduces a size of screen outputting broadcast data when it is outputted through the IPTV at the time of data reception from an external data transmission server, and controls output of external data so that is to be provided on a blank space of the screen, and a method of the same.

It is still another object of the present invention to provide a system for interfacing external data to IPTV, which registers unique numbers of mobile phones and IPTVs in conjunction with an external data transmission server in advance, and transmits information about a particular memorial day to IPTV at a desired time depending on user's setting for its output, and a method of the same.

It is still another object of the present invention to provide a system for interfacing external data to IPTV, which transmits matching local advertisement data based goods code information and local information of IPTV by containing the goods code information in scene information of the broadcast data for its output, so that the broadcast scene matches the contents of local advertisement, and a method of the same.

Technical Solution

In accordance with one aspect of the present invention, there is provided a system for interfacing external data to IPTV, including: a broadcast data transmission server for transmitting broadcast data to an STB (Set-Top Boxes) provided at each home over a broadcast access network; the STB, which registers an STB's unique number and a receiver's mobile phone number in a remote external data transmission server, and stores external data transmitted from the remote server and automatically switches the screen to output the external data onto the screen during the output of broadcast data transmitted from the broadcast data transmission server onto a screen; and the external data transmission server which receives the receiver's mobile phone number information and the STB's unique number information from the STB and registers the received information in advance in conjunction with each other, registers the received information in a mobile communication company's server including an SMS server and a sender's PC, and receives external data containing at least one of text data, moving image and still image data through the receiver's mobile phone or the STB's unique number, and transmits the external data to the STB.

In accordance with another aspect of the present invention, there is provided a method for interfacing external data to IPTV, including the steps of: (a) registering a unique number of each STB and a receiver's mobile phone number in an external data transmission server; (b) approving and registering, in the external data transmission server, the transmission of external data to a mobile phone of the receiver while sharing the receiver's information with a mobile communication company's server; (c) judging, in the external data transmission server, whether the external data transmitted from an external server including a sender's PC or plural mail servers and a mobile communication company's server, and an SMS server to a mobile phone of a particular receiver or a particular mail URL is received; (d) extracting, in the external data transmission server, the STB information associated with the receiver information; (e) transmitting, in the external data transmission server, the receiver information to the STB for its output onto the screen; (f) in the external data transmission server, receiving an authentication check signal from the STB and checking if it is a normal authentication signal through a comparison with the STB data; and (g) if it is checked to be a normal authentication allowing transmission of the external data, transmitting the external data to the STB.

Advantageous Effects

As mentioned above and will be described below, the present invention can interface external data received by various data communication devices such as a mobile phone, an email server and a mobile communication company's server to IPTV according user's setting for its output onto the screen, and sets up an output time of the external data in advance by a user to output it at a time of high concentration. In addition, for a sender who registered sender information in advance by a receiver, no authentication is required, thereby enabling more quick data transmission. Moreover, a broadcast screen to be displayed is automatically controlled based on the type and capacity of external data, to thereby output the external data without interfering with the original broadcast screen.

DESCRIPTION OF DRAWINGS

The above and other objects and features of the present invention will become apparent from the following description of the preferred embodiments given in conjunction with the accompanying drawings, in which:

FIG. 5 is a block diagram showing the configuration of the external data transmission server included in the system for interfacing the external data to the IPTV in accordance with the first embodiment of the present invention;

FIG. 6 is a flow chart describing an overall signal flow of the system for interfacing the external data to IPTV in accordance with the first embodiment of the present invention;

BEST MODE FOR THE INVENTION

Hereinafter, a first embodiment of the present invention will be described in detail with reference to the accompanying drawings.

Figure 1:
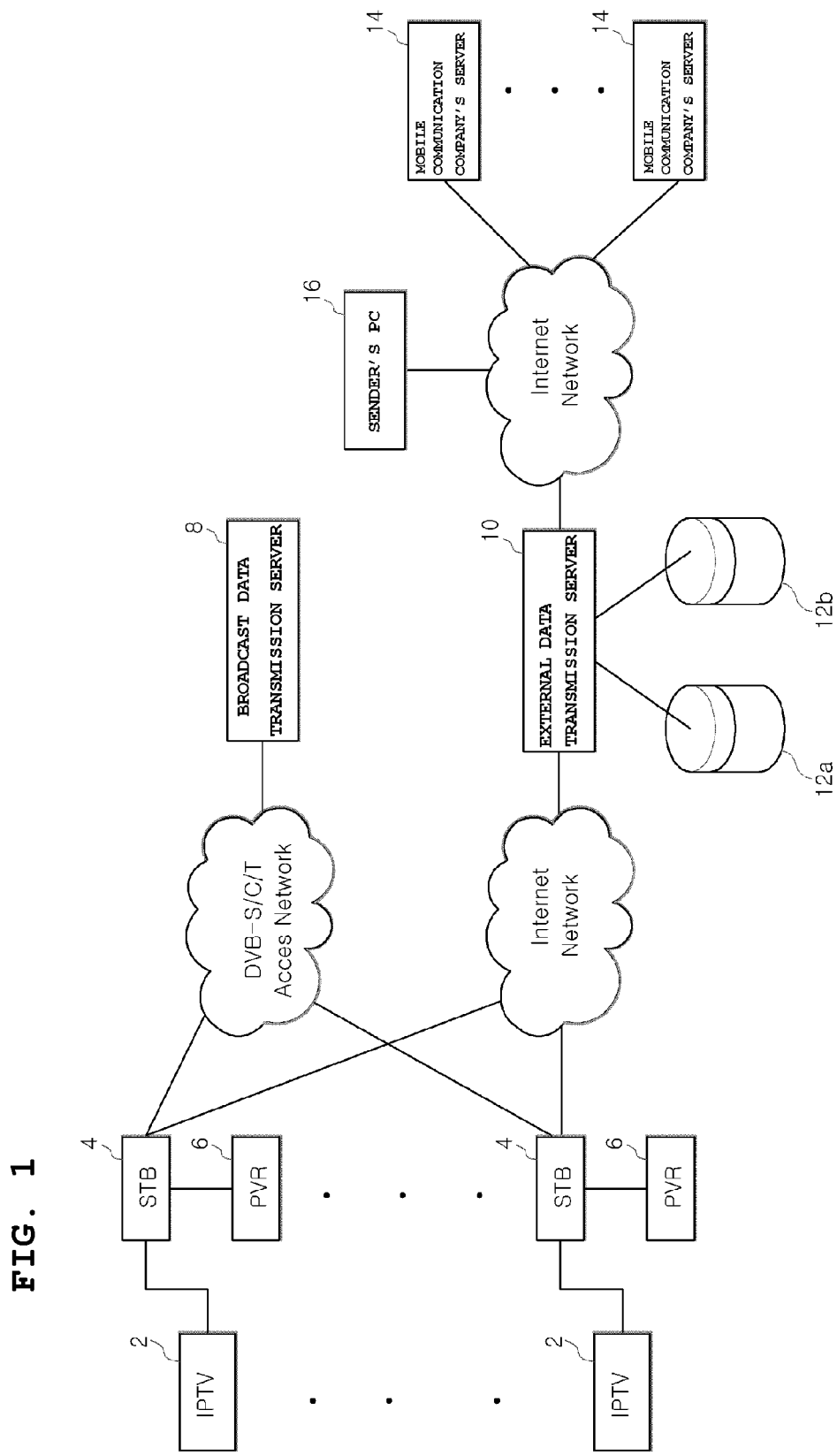
FIG. 1 is a schematic diagram showing the configuration of a system for interfacing external data to IPTV in accordance with a first embodiment of the present invention.

FIG. 1 is a diagram schematically showing an overall configuration of a system for interfacing external data to IPTV in accordance with a first embodiment of the present invention.

Referring to FIG. 1, the system of the present invention is a system, which registers unique numbers of mobile phones and IPTVs in conjunction with an external data transmission server in advance and has an SMS server, a mobile communication company's server and an external data transmission server linked with one another, and which transmits at least one of text, moving image data and still image data to a desired mobile phone or IPTV depending on user's setting for its output.

That is, the system of the present invention interfaces external data being transmitted to a mobile phone or a computer terminal to IPTV for its output onto a screen, wherein the external data contains at least one of text data, moving image data, and still image data.

In general, for DTV and PVR devices that constitute IPTV, PVR is configured in STB (Set-Top Box) in an embedded manner, and records broadcast data that is transmitted through a satellite, cable, terrestrial wave, or the like and provided from STB. And DTV, which is connected directly to STB, serves to receive and display a broadcast transmitted through the satellite, cable, or terrestrial wave, or to display contents stored in PVR.

This IPTV is provided with a modem inside, like a computer terminal, and allows for Internet surfing on a particular URL and data uploading and downloading.

In addition, the system of the present invention is a system, which registers unique numbers of mobile phones and IPTVs are in conjunction with an external data transmission server in advance and has an SMS server, mobile communication company's server and an external data transmission server linked with one another, and which judges whether sender's information has been previously registered and, if it is pre-registered sender's data, performs no additional authentication procedure and outputs received data onto a monitor of IPTV and, if it is related to a non-registered sender, performs an additional authentication procedure.

That is to say, the system of the present invention selectively performs output of external data transmitted from a server depending on sender's information for convenience improvement of users including old people, child, housewife, etc. More specifically, if external data is sent from a pre-registered sender, it is outputted through IPTV immediately without an authentication procedure. On the other hand, if external data is from a non-registered sender, it is outputted onto a screen after a successful authentication through an additional authentication procedure.

Also, the system of the present invention is a system, which registers unique numbers of mobile phones and IPTVs in conjunction with an external data transmission server in advance and has an SMS server, a mobile communication company's server and an external data transmission server linked to one another, and which transmits text, moving image data, or still image data to a desired mobile phone or IPTV depending on user's setting for its output and makes an automatic recording on broadcast data through PVR during an output time of the corresponding data.

That is, the system of the present invention controls the operations of automatically recording broadcast data being outputted onto a screen through PVR if external data is being outputted through IPTV, and of reproducing the recorded broadcast data at a time when the output of the external data is completed.

To this end, in the system of the present invention, a broadcast data transmission server 8, which sends satellite, cable or terrestrial wave broadcast data to an STB 4 provided at each home through a broadcast access network, is connected to the STB 4.

Here, the broadcast data transmission server 8 is installed at a broadcast company such as a local cable broadcast company, a terrestrial broadcast company, or the like, which receives the satellite, cable or terrestrial wave broadcast data and sends it to the STB 4 at each home.

The system of the invention is configured to allow the STB 4 to register an STB's unique number and a receiver's mobile phone number in a remote server, and store external data from the remote server and automatically switch the screen so as to output the external data onto the screen during the output of broadcast data sent from the broadcast data transmission server 8 onto the screen.

Also, in the system of the invention, there is an external data transmission server 10 which receives receiver's mobile phone number information and STB's unique number information from the STB 4 and registers them in advance in conjunction with each other, registers the related information in a mobile communication company's server (hereinafter, referred to as a mobile communication company's server 14) including an SMS server and a sender PC 16, and receives external data containing at least one of text data, moving image and still image data through the unique number of the receiver's mobile phone or STB for its transmission to the corresponding STB 4.

Therefore, the system of the present invention receives the receiver's mobile phone number information and the STB's unique number information from the STB 4, registers them in conjunction with each other and waits for a reception of external data, in a state where the external data transmission server 10 is connected to the mobile communication company's server 14 and the sender's PC 16 to enable data reception via the Internet network.

In such a state, when the external data with attached receiver's phone number information and sender's phone number information is transmitted from the mobile communication company's server 14, the external data transmission server 10 extracts the STB's unique number associated with the corresponding receiver's phone number and transmits the external data to the corresponding STB 4 for its output onto the IPTV 2.

At this time, the external data transmission server 10 provided in the system of the present invention can preferably register no-authentication sender's phone number information from the STB 4, that is, a request signal indicating that the output of external data through the IPTV 2 is allowed simultaneously with its reception without authentication, and the sender's phone number information. At this time, the external data transmission server 10 compares the sender's phone number information contained in the external data with pre-registered sender's phone information by the STB 4 and selectively performs an authentication procedure based on the comparison result.

Also, the user registers particular sender's phone number information in the external data transmission server 10 and, if there is external data received from the particular sender's phone number, the user can make a blocking setting so that the external data is not transmitted to the STB 4. Even in such a case, the mobile communication company's server 14 transmits the received external data to the receiver's mobile phone. Thus, the receiver can designed to establish that the external data is not outputted to the corresponding IPTV 2, while the external data is received by the receiver's mobile phone for its output, as in an existing communication system.

More preferably, the STB 4 provided in the system of the invention stores the external data transmitted from the external data transmission server 10. At this time, when the external data is outputted onto the screen of the IPTV 2, the STB 4 judges whether broadcast data is being outputted. If the broadcast data is being outputted through IPTV 2, the STB 4 records the broadcast data on the PVR 6 while switching the screen to output the external data. Thereafter, the STB 4 judges whether all of the external data has been outputted, and controls that the broadcast data recorded on the PVR 6 is to be outputted again through the IPTV 2.

Figure 2:
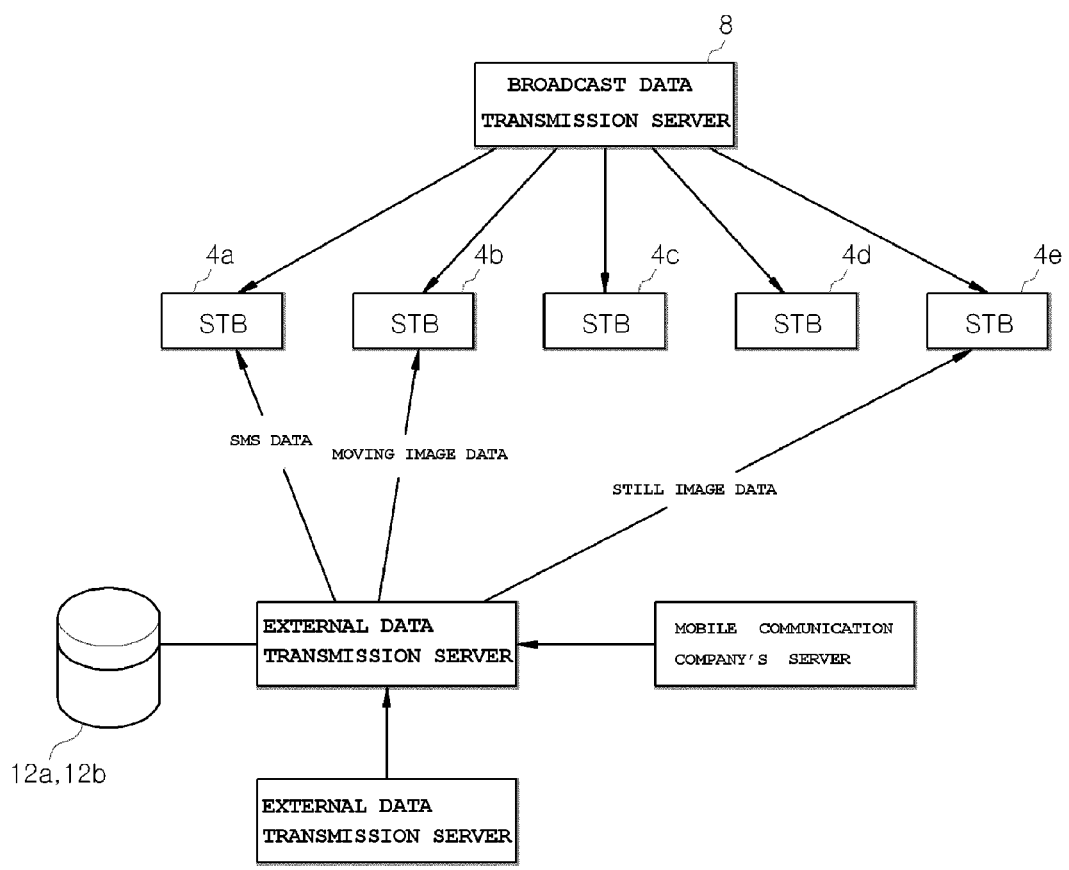
FIG. 2 is a block diagram describing a data flow of the system in accordance with the present invention.
Figure 3:
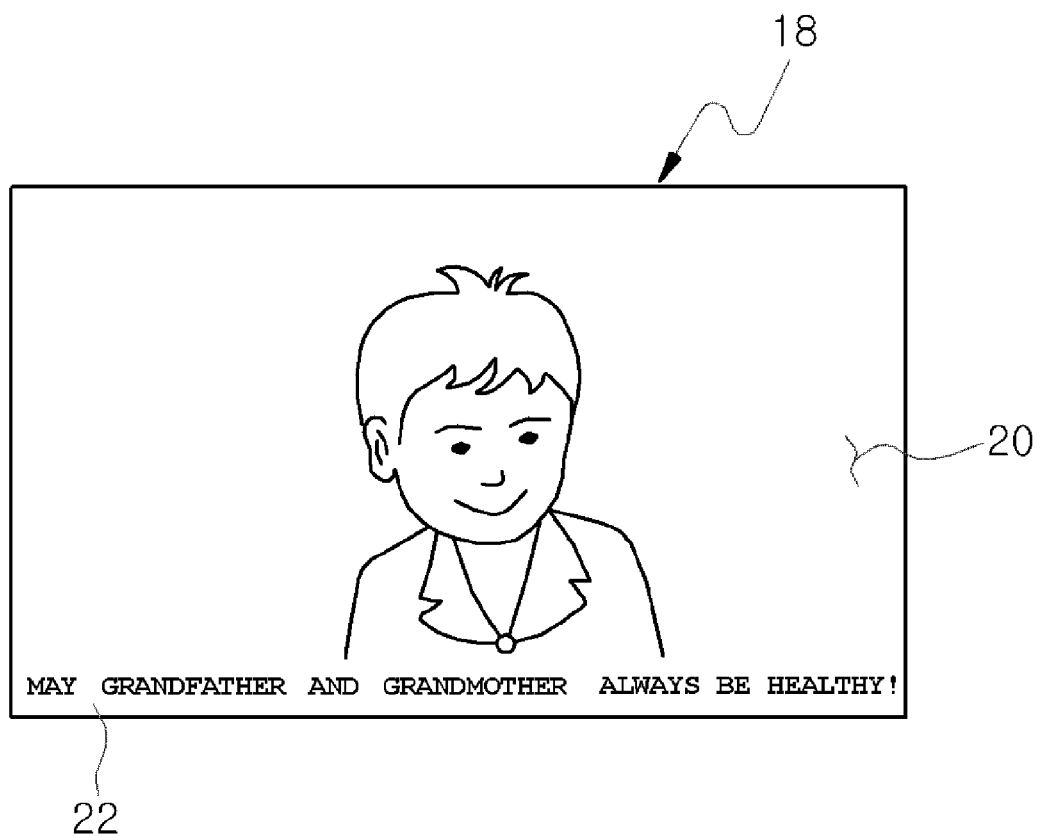
FIG. 3 is a screen showing external data outputted to IPTV though the use of the system in accordance with the present invention.

FIG. 2 is a block diagram describing a data flow of the system in accordance with the present invention, and FIG. 3 is a screen showing external data outputted to IPTV though the system of the present invention.

Referring to FIGS. 2 and 3, with the external data transmission server 10 included in the system of the present invention being connected to the mobile communication company's server 14 and the sender's PC 16 for data reception through the Internet network, the external data transmission server 10 receives receiver's mobile phone number information and STB's unique number information from the STB 4, registers them in conjunction with each other, and waits for reception of external data.

In this state, the user receives broadcast data by way of the STB 4, wherein the broadcast data transmission server 8 transmits different channel broadcast data to the STB 4 in response to a channel request signal from each home provided with a digital broadcast system such as IPTV.

Given the same channel broadcast data, the STB 4 at each home receives the same broadcast data and outputs it onto the screen.

At this time, when the external data with attached receiver's phone number information and sender's phone number information is transmitted from the mobile communication company's server 14, the external data transmission server 10 extracts the receiver's phone number information and sender's phone number information and transmits the external data to the STB 4 for its output onto the IPTV 2.

In addition, the output of the external data onto the screen of the IPTV 2 is achieved by making the STB 4 switch the screen to output the external data while executing a recording mode to allow the broadcast data being outputted onto the screen of the IPTV 2 to be recorded on the PVR 6.

All of the moving image data, still image data, and text data as the external data can be all outputted onto the IPTV. For example, the broadcast data outputted through the IPTV 4 is switched to an automatic recording mode by the STB 4, while the external data as shown in FIG. 3 is outputted onto the screen. As an example of moving image data, as illustrated in FIG. 3, a grandson sends moving image data to a grandfather's or grandmother's mobile phone number, and at the same time the moving image data is sent to the STB 4 via the external data transmission server 10. That is, FIG. 3 shows an example where multimedia data including a moving image screen 20 and a text 22 is outputted simultaneously.

In particular, if old people, child, or housewife with poor machine manipulation registers his or her own mobile phone in the external data transmission server 10 in advance, it is possible to receive the external data through his or her receiver's mobile phone by way of the IPTV 2 and output it onto the IPTV 2.

Figure 4:
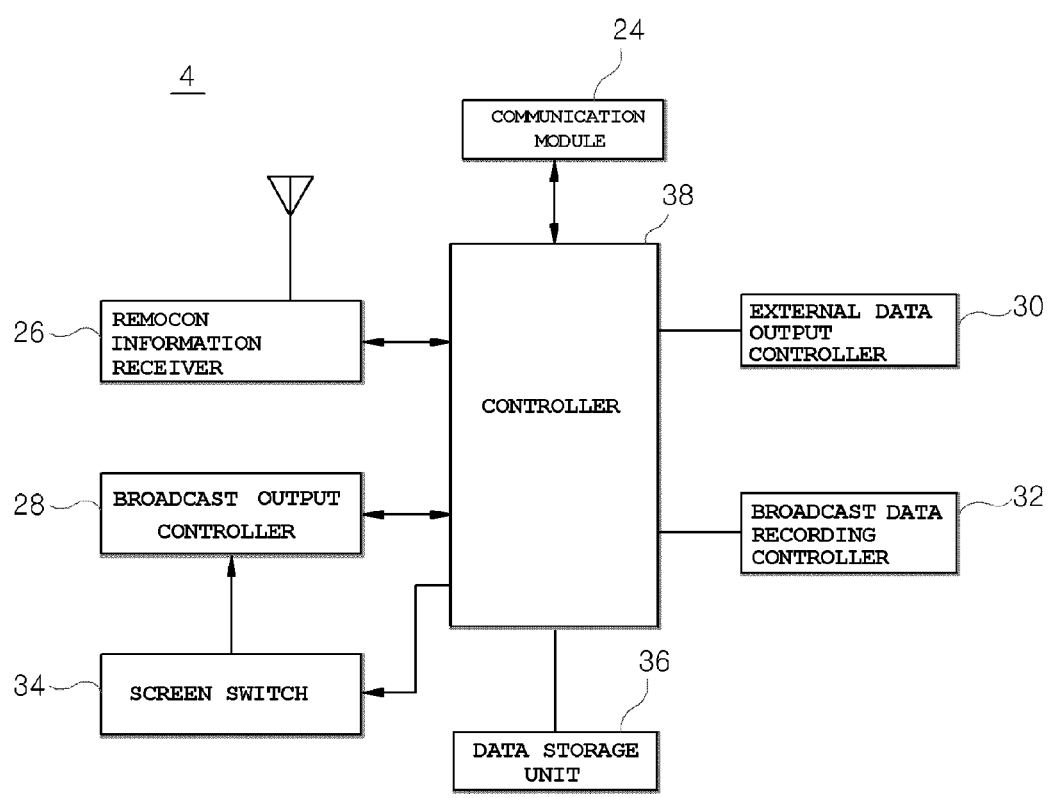
FIG. 4 is a block diagram showing the configuration of an STB included in the system in accordance with the present invention.

FIG. 4 is a block diagram showing the configuration of an STB included in the system in accordance with the present invention.

Referring to FIG. 4, the STB 4 in the system of the present invention is constituted by a communication module 24, a remocon information receiver 26, a broadcast output controller 28, an external data output controller 30, a broadcast data recording controller 32, a screen switch 34, a data storage unit 36, and a controller 38.

The communication module 24 is connected to the broadcast data transmission server 8 and the external data transmission server 10 over a broadcast access network or Internet network to perform data communications between them and for protocol matching and filtering operations.

The remocon information receiver 26 generates a request signal for interfacing received data through a viewer's mobile phone to the IPTV 2, and receives a remocon signal associated with receiver's mobile phone number information, no-authentication sender's phone number information, and an authentication information input signal.

The broadcast output controller 28 is a known broadcast output controller which receives digital broadcast data from the broadcast data transmission server 8 and controls the output thereof through the DTV 2. This broadcast output controller 28 corresponds to the hardware and software configurations built in the ordinary STB 4. The general digital broadcast data is compressed in MPEG version and decompressed by a decoder (not shown) provided in the STB 4. However, these components are nothing but the general ones for IPTV, and the broadcast output controller 28 performs a typical broadcast output function by such hardware and OS, so a detailed description thereon will be omitted here.

The external data output controller 30 executes a data output control to output external data consisting of at least one of a moving image, a still image and text data transmitted from the external data transmission server 10 onto the screen of the IPTV 2.

The broadcast data recording controller 32 servers to control the PVR 6 so that it records broadcast data being outputted during the output time of the external data by switching the PVR 6 to a recoding mode.

The screen switch 34 operates in conjunction with the broadcast data recording controller 32 and carries out a control operation that switches the screen from the broadcast data being outputted through the IPTV 2 to the external data.

Also, the screen switch 34 controls the screen output of the IPTV 2 by determining whether the external data or broadcast data is to be outputted onto the screen of the IPTV 2. For this, it generates a control signal to do so and transmits the same to the broadcast output controller 28 and the broadcast data recording controller 32 for achieving screen switching.

The data storage unit 36 stores the external data transmitted from the external data transmission server 10, authentication password information pre-registered by viewers, an STB's unique number, and a control routine for screen switching.

The screen switching control routine stored in the data storage unit 36 refers to a control routine which generates a control signal to automatically record broadcast data on the PVR 6 at a time when the external data is to be outputted, and which has been programmed in advance to output the external data onto the screen.

The controller 38 controls the operations of receiving the interface request signal, the receiver's mobile phone number information and no-authentication sender's phone number information, and the authentication information input signal provided through the remocon information receiver 26, and of storing the authentication information as above. It also controls the operations of transmitting the interface request signal, the receiver's mobile phone number information and no-authentication sender's phone number information, and the STB's unique number to the server, performing an authentication procedure upon receipt of the external data, switching the broadcast data to the recording mode, and outputting the external data onto the screen of the IPTV 2.

FIG. 5 is a block diagram showing the configuration of the external data transmission server 10 included in the system for interfacing the external data to the IPTV in accordance with the first embodiment of the present invention.

Referring to FIG. 5, the external data transmission server 10 included in the system of the first embodiment of the present invention is constituted by a communication module 40, an authentication processor 42, a screen control information generator 44, an STB information manager 46, an STB information database (DB) 48a, an authentication information DB 48b, a sender registration information DB 48c, a screen control information DB 48d, and a controller 50.

The communication module 40 serves to perform data communications between the STB 4 provided at each home and the sender's PC 16 and the mobile communication company's server 14.

The authentication processor 42 receives and registers unique numbers and sender authentication information transmitted from the STB 4, and authenticates a sender who transmits at least one of a short message, still image data and moving image data through the sender's PC 16 or the mobile communication company's server 14 to confirm whether the sender is a sender allowed for data transmission by a receiver in advance.

The screen control information generator 44 generates screen control data for switching the PVR to a recording mode to record the broadcast data being outputted onto the screen of the PVR 6 connected to the STB 4, turning on the PVR 6, and switching the screen to output the external data.

The STB information manager 46 manages unique numbers allocated to all STBs including the STB 4.

The STB information DB 48a stores the unique numbers allocated to all STBs including the STB 4, and the authentication information DB 48b has authentication information of a receivers that receives the external data established in conjunction with the unique numbers of the STBs 4.

The sender's registration information DB 48c registers and stores allowable senders' unique numbers by the receiver in advance so that the external data can be sent to the STB 4. The screen control information DB 48d stores screen control data for switching the PVR 6 to a recording mode to record the broadcast data being outputted onto the screen of the PVR 6 connected to the STB 4, turning on the PVR 6, and switching the screen to output the external data.

The controller 50 controls the operations that receive and register sender's authentication information in advance from a receiver that is a user of each STB 4, and is connected to the mobile communication company's server 14 and the sender's PC 16 to authenticate a sender of external data received over the Internet network. It also controls the operation of transmitting the external data to the STB 4 upon completion of authentication, so that the external data is outputted onto the IPTV 2.

At this time, if the external data is received at a time when a broadcast screen is outputted onto the screen of the IPVE 2, the controller 50 controls the operation of outputting the external data onto the screen to again output the broadcast data later while generating a recording control signal to the PVR 6.

Now, the functions and operations of the system for interfacing the external data to IPTV in accordance with the first embodiment of the present invention will be described in detail with reference to the accompanying drawings.

FIG. 6 is a flow chart describing an overall signal flow of the system for interfacing the external data to IPTV in accordance with the first embodiment of the present invention.

First, the process of the present invention registers a unique number of each STB 4 in the remote external data transmission server 10, together with receivers' mobile phone numbers (step ST-1).

Then, the external data transmission server 10 shares the corresponding receiver information with the mobile communication company's server 14, and interfaces external data transmitted to the corresponding receiver's mobile phone to the IPTV 2 for outputting it onto the screen.

Therefore, the external data transmission server 10 judges whether it receives the external data transmitted to a particular receiver's mobile phone or a particular mail URL from an external data transmission means including the sender's PC 16 or plural mail servers (not shown) and the mobile communication company's server 14, and the SMS server (not shown)(step ST-3).

Next, based on the receiver information established in the database, the external data transmission server 10 extracts the information on the STB 4 associated with the receiver information (ST-4).

In succession, the external data transmission server 10 transmits the receiver information to the STB 4 for its output onto the screen.

By this, the STB 4 allows the receiver to check the receiver information outputted onto the screen of the IPTV 2 and to issue an authentication check signal, that is, an external data transmission allowance signal through a remocon or a key panel (ST-5).

Then, the external data transmission server 10 receives the authentication check signal from the STB 4 and checks whether it is a normal authentication signal by a comparison with the authentication information associated with the STB 4 (ST-6 and ST-7).

That is, the external data transmission server 10 receives the authentication check signal from the STB 4 and, if it is checked to be a normal authentication allowing the transmission of the external data, the external data transmission server 10 transmits the external data to the STB 4 (ST-9).

Then, the STB 4 outputs the external data onto the screen of the IPTV 2 (ST-10). If the external data is related to text data, it would output the text data onto the screen; and, if the external data is related to moving image data, it would output the moving image data onto the screen by activating a video codec.

On the other hand, if the data from the STB 4 is checked to be an abnormal authentication that does not allow the transmission of the external data, the external data transmission server 10 outputs external data transmission disallowance information to a corresponding one of the sender's PC 16, the mobile communication company's server 14 and the SMS server (not shown)(ST-8).

Preferably, the external data transmission server 10 may additionally compare STB information that sends an authentication check request signal with STB information that receives the authentication check signal to determine whether their unique numbers are the same. By doing so, it may be possible to check whether normal data is received.

Thus, in a state where the external data transmission server 10 is connected to the mobile communication company's server 14 and the sender's PC 16 for data reception over the Internet network, when the external data with attached receiver's phone number information and sender's phone number information is transmitted from the mobile communication company's server 14, the external data transmission server 10 extracts the STB's unique number associated with the receiver's phone number and transmits the external data to the STB 4 for outputting it onto the screen of the IPTV 2.

Figure 7A:
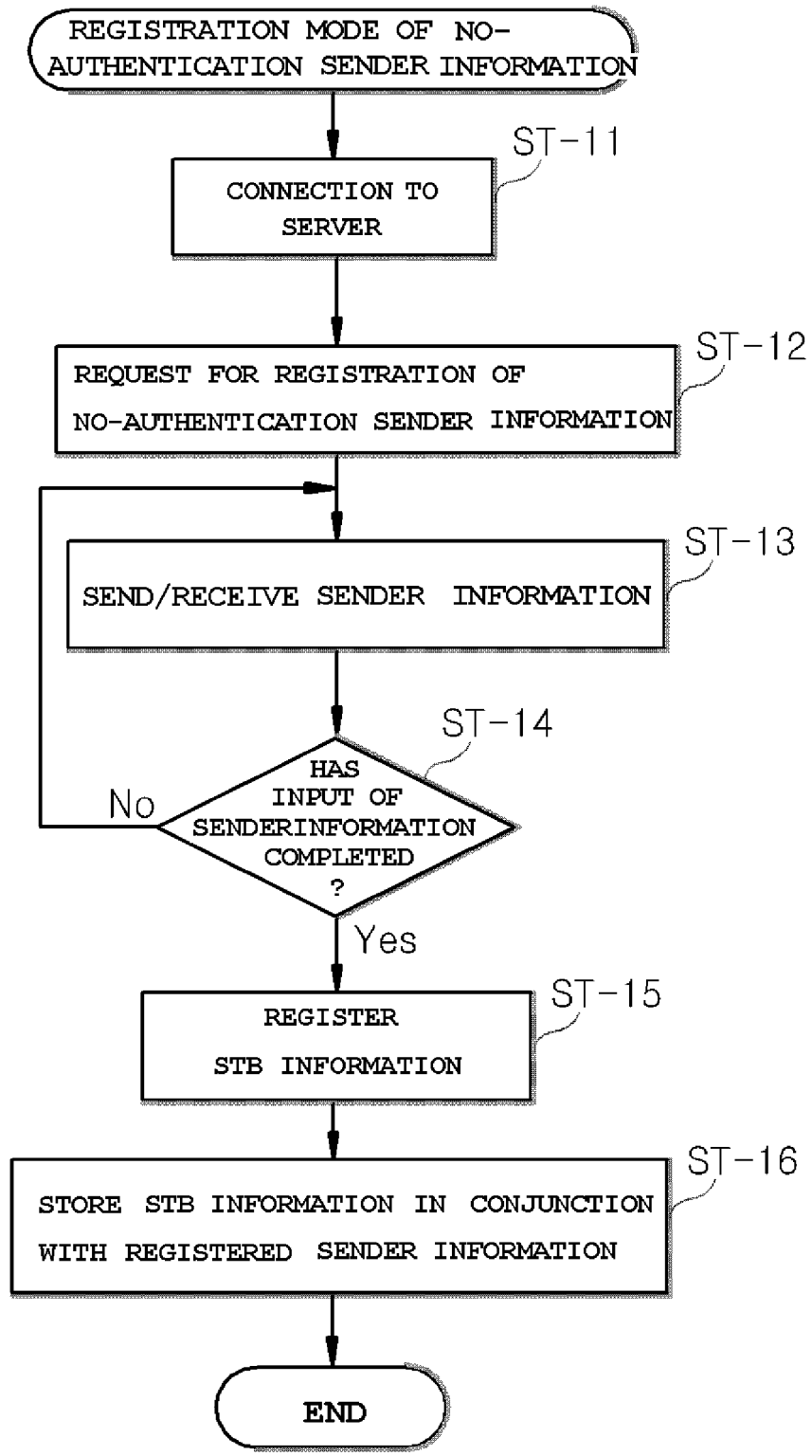
FIGS. 7A and 7B are a sender authentication omission information registration mode and an external data reception path to be set up by a user in advance in accordance with the first embodiment of the present invention.
Figure 7B:
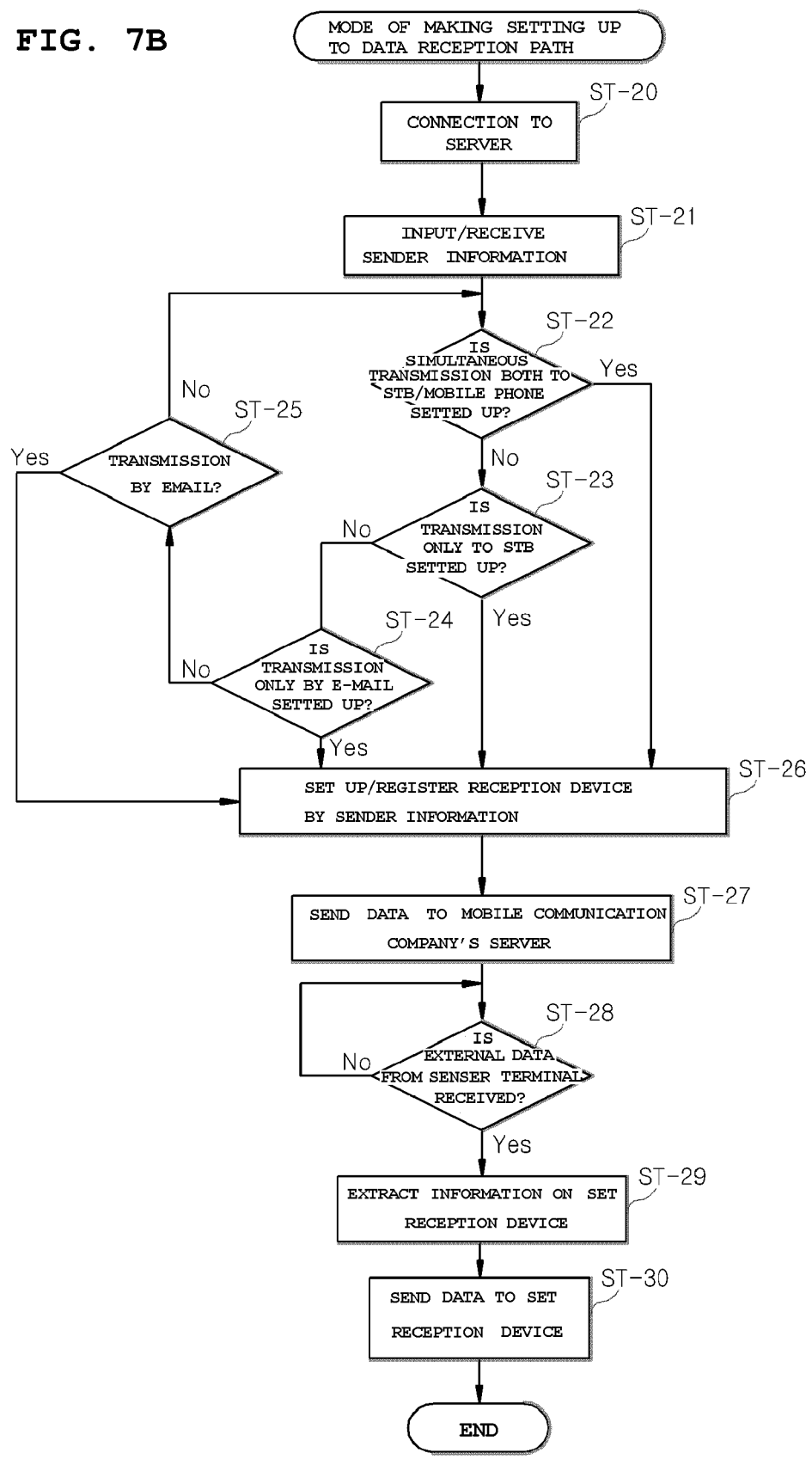

FIGS. 7A and 7B are flow charts describing a signal flow of registering a sender and establishing a data reception path in the system for interfacing the external data to IPTV in accordance with the first embodiment of the present invention.

First, a registration mode for no-authentication sender information in order for the STB 4 to receive the external data through the system of the present invention is illustrated in FIG. 7A, and an external data reception path for a user to establish in advance is illustrated in FIG. 7B.

Referring to FIG. 7A, in order for the STB 4*a* to receive the external data, a registering process of no-authentication sender information first makes a connection to the external data transmission server 10 by the IPTV 2 or a receiver's PC (not shown) over the Internet (ST-11).

In this state, the external data transmission server 10 receives a request signal for registering no-authentication sender information from the IPTV 2 or the receiver's PC, together with sender information that requires no authentication from the IPTV 2 or the receiver's PC (ST-12 and ST-13).

Next, the external data transmission server 10 judges whether the reception of no-authentication sender information is completed and, if so, it registers the related information in its temporal memory (ST-14).

Thereafter, the external data transmission server 10 registers the no-authentication sender information in conjunction with the unique number of the STB 4 that has registered the sender information in the database (ST-15 and ST-16).

Referring FIG. 7B, a process of establishing an external data reception path in advance will be now described in detail. First, the process makes a connection to the external data transmission server 10 by the IPTV 2 or a sender's PC (not shown) over the Internet (ST-20).

In this state, the external data transmission server 10 receives sender information from the IPTV 2 or the sender's PC and, if external data is received from the sender, it judges whether the external data is to be sent to both the STB 4 and a mobile phone (now shown) at the same time (ST-22), only to the STB 4 (ST-23), only to the mobile phone (ST-24), or by mail (ST-25).

That is, the receiver makes a connection to the external data transmission server 10 and establishes in advance a means to which the external data received from plural servers liked to the external data transmission server 10 is to be sent.

Therefore, when the receiver establishes a reception path of external data provided from each sender, the established data is registered in the external data transmission server 10 (ST-26).

In this state, the external data transmission server 10 sends the corresponding reception path data to the mobile communication company's server 14 including the SMS server, or the mail server (ST-27).

Then, when at least one of SMS data, still image data and moving image data is received by the SMS server, the mobile communication company's server 14, or the mail server, the SMS server (ST-28), the SMS server, the mobile communication company's server 14, or the mail server extracts the corresponding reception path data pre-established by sender and then sends the same to a corresponding reception apparatus (ST-29).

At this time, although at least one of text data and still image/moving image data is received by the SMS server or the mobile communication company's server 14, if the external data sent from the sender is set up to be sent to the IPTV 2 or by email, the SMS server or the mobile communication company's server 14 sends at least one of the text data and still image/moving image data as the external data received to the external data transmission server 10 (ST-30).

Then, the external data transmission server 20 sends the external data to the corresponding reception apparatus, along the pre-established sender's reception path.

Thus, if the user registers the particular sender's phone number information in the external data transmission server 10 and then receives the external data from the sender's phone number, the external data can be set up to prevent its transmission to the STB 4. Even in this case, the mobile communication company's server 14 still performs transmission of the received external data to the receiver's mobile phone. Therefore, this means that the receiver does not output the external data only through the IPTV 2, but can receive it through his or her mobile phone, as in the existing communication system.

Figure 8:
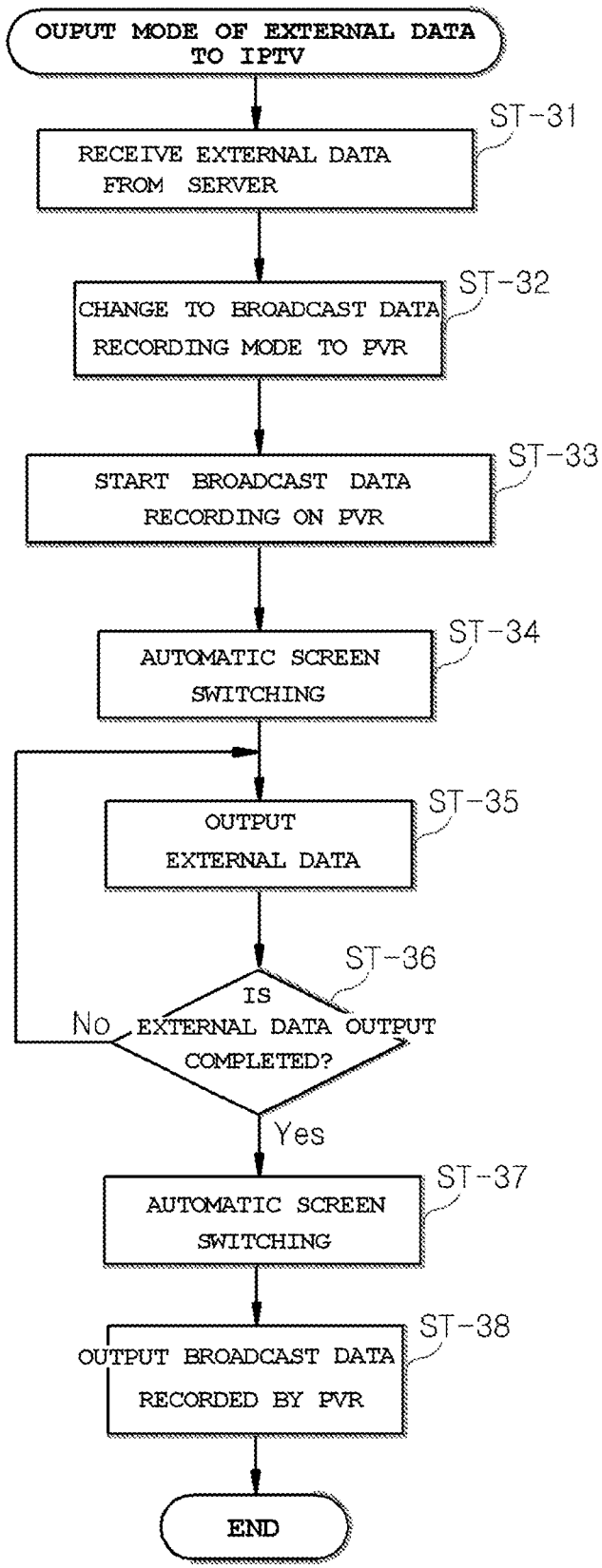
FIG. 8 is a flow chart describing an output screen designation of external data being outputted through the system for interfacing the external data to IPTV in accordance with the first embodiment of the present invention.

FIG. 8 is a flow chart describing a process of designating an output screen of external data being outputted through the system for interfacing the external data to IPTV in accordance with the first embodiment of the present invention.

First, in the system of the present invention, in a state where the STB 4 provided at each home and the external data transmission server 10 are connected with each other, the external data transmission server 10 receives external data from the SMS server, the mobile communication company's server 14 or the mail server and sends it to the STB 4 (ST-31).

Then, the STB 4 receives the external data and at the same time controls the PVR 6 linked to the STB 4 itself to switch it to a broadcast data recording mode (ST-32).

Thus, the PVR 6 is switched to the broadcast data recording mode to initiate recordation of the broadcast data being displayed on the current screen (ST-33) and, at the same time, the STB 4 switches the screen to output the received external data on the screen (ST-34).

In that state, the STB 4 judges whether the output of the external data is completed and, if so, performs an automatic screen switching to output the broadcast data and outputs the broadcast data pre-recorded on the PVR 6 onto the screen.

Hereinafter, a second embodiment of the present invention will be described in detail with reference to the accompanying drawings.

Figure 9:
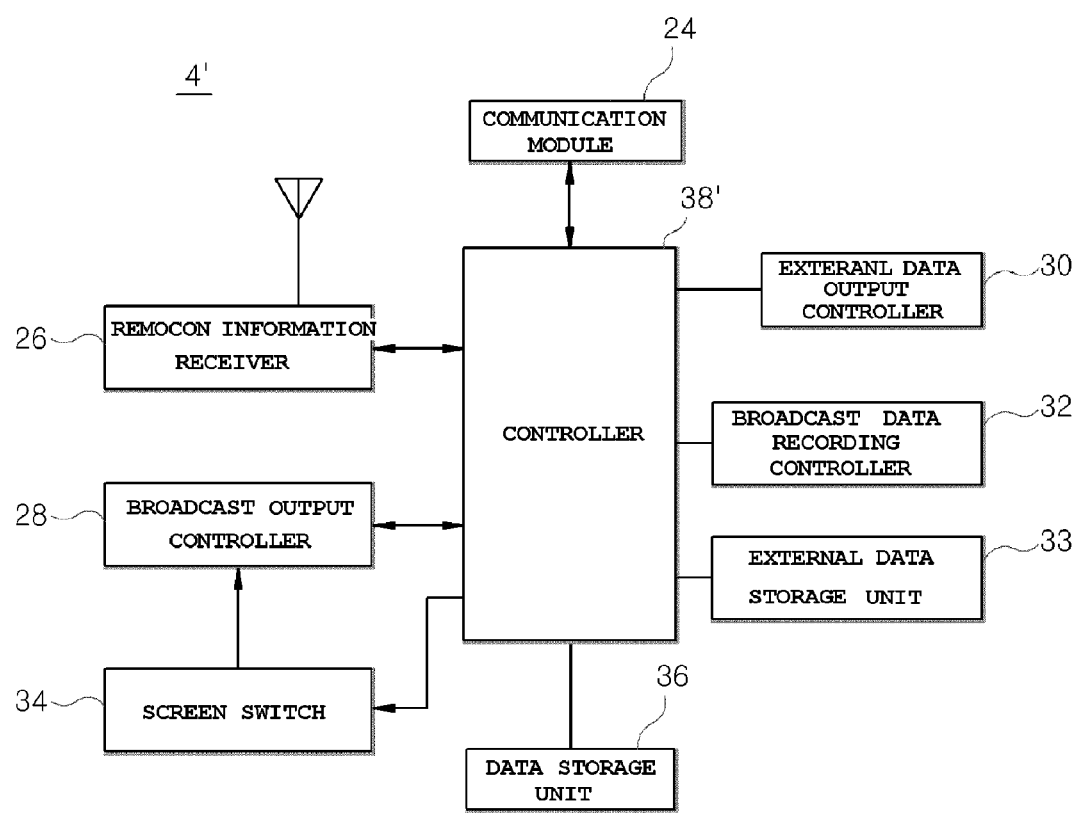
FIG. 9 is a block diagram showing the configuration of an STB 4' included in a system for interfacing external data to IPTV in accordance with the second embodiment of the present invention.

FIG. 9 is a block diagram showing the configuration of an STB 4' included in a system for interfacing external data to IPTV in accordance with the second embodiment of the present invention.

Referring to FIG. 9, the system of the present invention establishes received external data to be outputted at desired times according to user's setting. It also outputs the external data onto the screen in real time if there is no additional setting, and makes an establishment of outputting it, especially when an IPTV's power turn-on/off signal is generated, and controls the output of the external data depending on the established data.

For this, the STB 4' in the system of the present invention is constituted by a communication module 24, a remocon information receiver 26, a broadcast output controller 28, an external data output controller 30, a broadcast data recording controller 32, an external data storage unit 33, a screen switch 34, a data storage unit 36, and a controller 38'.

The communication module 24 is connected to the broadcast data transmission server 8 and the external data transmission server 10 over a broadcast access network or Internet network to perform data communication between them and for protocol matching and filtering operations in response to external data output time information received from a remocon (not shown).

The remocon information receiver 26 generates a request signal for interfacing received data through a viewer's mobile phone to the IPTV 2, and receives a remocon signal associated with receiver's mobile phone number information, no-authentication sender's phone number information, an authentication information input signal, and the external data output time information.

The broadcast output controller 28 is a known broadcast output controller which receives digital broadcast data from the broadcast data transmission server 8 and controls the output thereof through the DTV 2. This broadcast output controller 28 corresponds to the hardware and software configurations built in the ordinary STB 4'. The general digital broadcast data is compressed in MPEG version and decompressed by a decoder (not shown) involved in the STB 4'. However, these components are nothing but the general ones for IPTV, and the broadcast output controller 28 performs a typical broadcast output function by such hardware and OS, so a detailed description thereon will be omitted here.

The external data output controller 30 performs a data output control to output external data consisting of at least one of a moving image, a still image and text data transmitted from the external data transmission server 10 onto the screen of the IPTV 2.

The broadcast data recording controller 32 controls the PVR 6 so that it records broadcast data being outputted during the output time of the external data by switching the PVR 6 to a recoding mode.

The external data storage unit 33 stores external data containing at least one of email data, short data, still image and moving image data received from an SMS server, a mobile communication company's server 14, and a mail server (not shown).

The screen switch 34 operates in conjunction with the broadcast data recording controller 32 and performs a control operation of switching the screen from broadcast data being outputted through the IPTV 2 to the external data.

Also, the screen switch 34 controls the screen output of the IPTV 2 by determining whether the external data or broadcast data is outputted onto the screen of the IPTV 2. For this, it generates a control signal to do so and transmits the same to the broadcast output controller 28 and the broadcast data recording controller 32 for achieving screen switching.

The data storage unit 36 stores the external data from the external data transmission server 10, authentication password information pre-registered by viewers, and the STB' unique number, as well as a control routine for screen switching and the external data output time information preset by viewers.

The screen switching control routine stored in the data storage unit 36 refers to a control routine which generates a control signal to automatically record broadcast data on the PVR 6 at a time when the external data is to be outputted, and which has been programmed in advance for screen switching depending on the external data output time information.

The controller 38' controls the operations that receive the interface request signal, the receiver's mobile phone number information and no-authentication sender's phone number information, and the authentication information input signal provided through the remocon information receiver 26, and store the received information as authentication information. It also controls the operations of transmitting the interface request signal, the receiver's mobile phone number information and no-authentication sender's phone number information, and the STB's unique number to the external data transmission server, performing an authentication procedure upon receipt of the external data to receive/store the external data in the external data storage unit 33, switching the broadcast data to a recording mode based on the preset output time information, and outputting the external data stored in the external data storage unit 33 onto the screen of the IPTV 2.

Through this, if the real time output of the external data is not set up in the STB 4' in the system of the present invention, but the external data is set up to be outputted for every hour or when a power turn-on/off signal is generated, the corresponding external data stored in the external data storage unit 33 would be outputted onto the screen at the set time.

In particular, when a power turn-off signal is generated, the IPTV 2 and the STB 4' are not turned off until all of the external data is outputted onto the screen.

Now, the functions and operations of the system for interfacing external data to IPTV in accordance with the second embodiment of the present invention will be described in detail with reference to the accompanying drawings.

Figure 10:
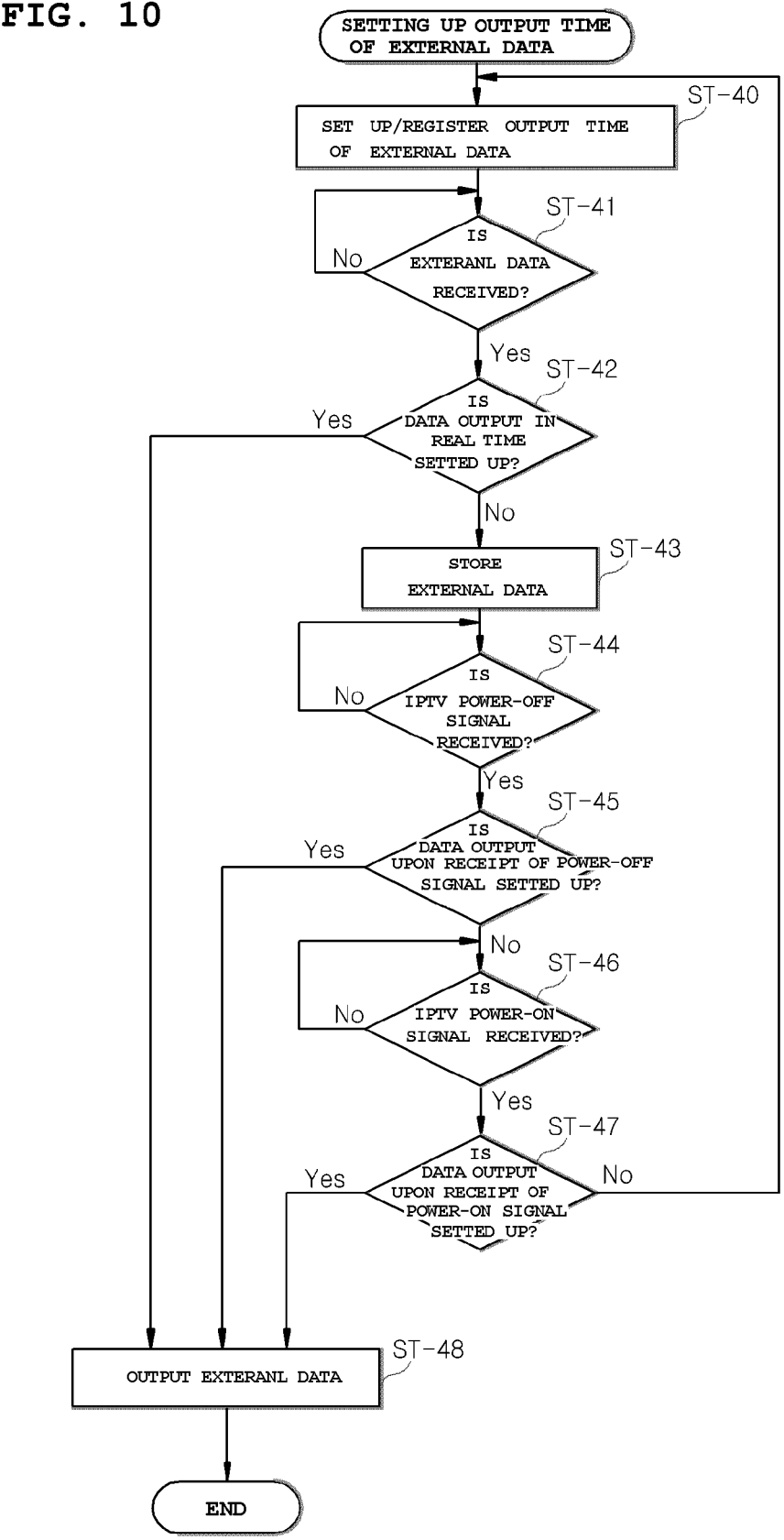
FIG. 10 is a flow chart describing a signal flow of the system for interfacing external data to IPTV in accordance with the second embodiment of the present invention.

FIG. 10 is a flow chart describing a signal flow of the system for interfacing the external data to IPTV in accordance with the second embodiment of the present invention.

First, the user sets up in advance a time when external data provided from the external server and received by the STB 4' is to be outputted, that is, the user sets up an output time of external data in the STB 4' through a remocon or key panel (ST-40).

Then, the STB' stores the external data output time in the data storage unit 36 prepared therein.

In that state, when the STB 4' receives the external data containing at least one of email data, a short message, and still image/moving image data from the external server, the controller 38' in the STB 4' judges whether the external data is set up to be outputted in real time based on the preset external data output time information (ST-41 and ST-42).

If the external data is set up to be outputted in real time, the controller 38' of the STB 4' outputs the external data onto the screen.

Of course, if any broadcast data is being outputted at a certain time in advance, the controller 38' of the STB 4' allows the broadcast data recording controller 32 to record the broadcast data on the PVR 6 so as to output the broadcast data later.

On the other hand, if the external data is not set up to be outputted in real time but is set up to be outputted upon issuance of a power turn-off signal, the controller 38' of the STB 4' controls the operation of storing the received external data in the external data storage unit 33 prepared therein, and extracting the external data stored in the external data storage unit 33 for outputting on the screen upon receipt of the power turn-off signal (ST-43 and ST-44).

That is, the actual power turning-on time is made after the external data is all outputted onto the screen.

Meanwhile, if the external data is not set up to be outputted onto the screen upon issuance of the power turn-off signal but is set up to be outputted on the screen upon issuance of a power turn-on signal, the controller 38' of the STB 4' controls the operation of storing the received external data in the external data storage unit 33 prepared therein, and extracting the external data stored in the external data storage unit 33 for outputting onto the screen upon receipt of the power turn-on signal (ST-45, ST-46, and ST-47).

Hereinafter, a third embodiment of the present invention will be described in detail with reference to the accompanying drawings.

Figure 11:
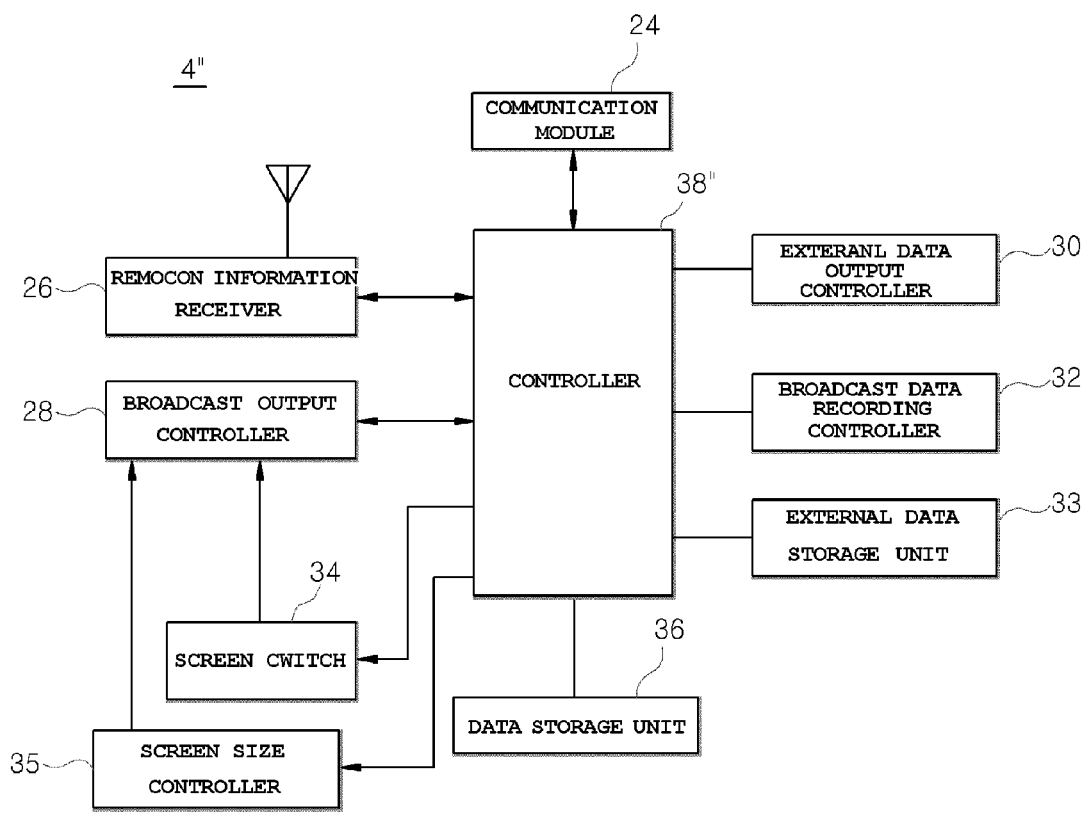
FIG. 11 is a block diagram showing the configuration of an STB 4" included in a system for interfacing external data to IPTV in accordance with the third embodiment of the present invention.

FIG. 11 is a block diagram showing the configuration of an STB 4" included in a system for interfacing external data to IPTV in accordance with the third embodiment of the present invention.

Referring to FIG. 11, the system of the present invention controls the operations of automatically reducing a size of output screen of broadcast data if the broadcast data is set up to be outputted though IPTV at a when it is received from the external data transmission server, and of outputting the external data in a marginal space of the screen.

Therefore, the STB 4" in the system of the present invention controls an output size of broadcast data depending on the type and capacity of the external data to sufficiently output the external data in a marginal portion of the broadcast data.

To this end, the STB 4" in the system of the present invention is constituted by a communication module 24, a remocon information receiver 26, a broadcast output controller 28, an external data output controller 30, a broadcast data recording controller 32, an external data storage unit 33, a screen switch 34, a screen size controller 35, a data storage unit 36, and a controller 38".

The communication module 24 is connected to the broadcast data transmission server 8 and the external data transmission server 10 over a broadcast access network or Internet network to perform data communications between them and for protocol matching and filtering operations in response to external data output time information received from a remocon (not shown).

The remocon information receiver 26 generates a request signal for interfacing received data through a viewer's mobile phone to the IPTV 2, and receives a remocon signal associated with receiver's mobile phone number information and no-authentication sender's phone number information, an authentication information input signal, and external data output time information.

The broadcast output controller 28 is a known broadcast output controller which receives digital broadcast data from the broadcast data transmission server 8 and controls the output thereof through the DTV 2. This broadcast output controller 28 corresponds to the hardware and software components built in the ordinary STB 4". The general digital broadcast data is compressed in MPEG version and decompressed by a decoder (not shown) provided in the STB 4". However, these components are nothing but the general ones for IPTV, and the broadcast output controller 28 performs a typical broadcast output function by such hardware and OS, so a detailed description thereon will be omitted here.

The external data output controller 30 executes a data output control to output external data consisting of at least one of a moving image, a still image and text data transmitted from the external data transmission server 10 onto the screen of the IPTV 2.

The broadcast data recording controller 32 controls the PVR 6 so that it records broadcast data being outputted during the output time of the external data by switching the PVR 6 to a recoding mode.

The external data storage unit 33 stores the external data containing at least one of email data, short data, a still image and a moving image data received from an SMS server, the mobile communication company's server 14, or a mail server (not shown).

The screen switch 34 operates in conjunction with the broadcast data recording controller 32 and performs a control operation for switching the screen from broadcast data being outputted through the IPTV 2 to the external data.

Also, the screen switch 34 controls the screen output of the IPTV 2, that is, it determines whether external data or broadcast data is to be outputted onto the screen of the IPTV 2 to control the screen output. For this, it generates a control signal to do so and transmits the same to the broadcast output controller 28 and the broadcast data recording controller 32 for achieving screen switching.

The screen size controller 35 controls a size of broadcast data being outputted onto the screen through the broadcast output controller 28 depending on the type and capacity of the external data.

The data storage unit 36 stores the external data from the external data transmission server 10, authentication password information pre-registered by viewers, and the STB' unique number, as well as a control routine for screen switching, the external data output time information preset by viewers and size control information of broadcast data depending the type and capacity of the external data.

The screen switching control routine stored in the data storage unit 36 refers to a control routine which generates a control signal to automatically record broadcast data on the PVR 6 at a time when the external data is to be outputted, and which has been programmed in advance for screen switching depending on the external data output time information.

The controller 38" controls the operations that receive the interface request signal, the receiver's mobile phone number information and no-authentication sender's phone number information, and the authentication information input signal provided through the remocon information receiver 26, and store the received information as authentication information. It also controls the operations of transmitting the interface request signal, the receiver's mobile phone number information and no-authentication sender's phone number information, and the STB' unique number to the server, performing an authentication procedure upon receipt of the external data to receive/store the external data in the external data storage unit 33, switching the broadcast data to a recording mode based on the preset output time information, outputting the external data stored in the external data storage unit 33 onto the screen of the IPTV 2. Additionally, it controls the size of broadcast data depending on the type and capacity of the external data, and further controls the operation of outputting the external data in a marginal portion of the broadcast data generated by such size control.

Preferably, the STB 4" of the system of the present invention controls the size of broadcast data being outputted by the screen size controller 35 depending on the type and capacity of the external data if the external data is related to text data, and changes the broadcast data to a recording mode and supports that the external data is to be outputted in full screen if it is related to still image data or moving image data.

Now, the functions and operations of the system for interfacing external data to IPTV in accordance with the third embodiment of the present invention will be described in detail with reference to the accompanying drawings.

Figure 12:
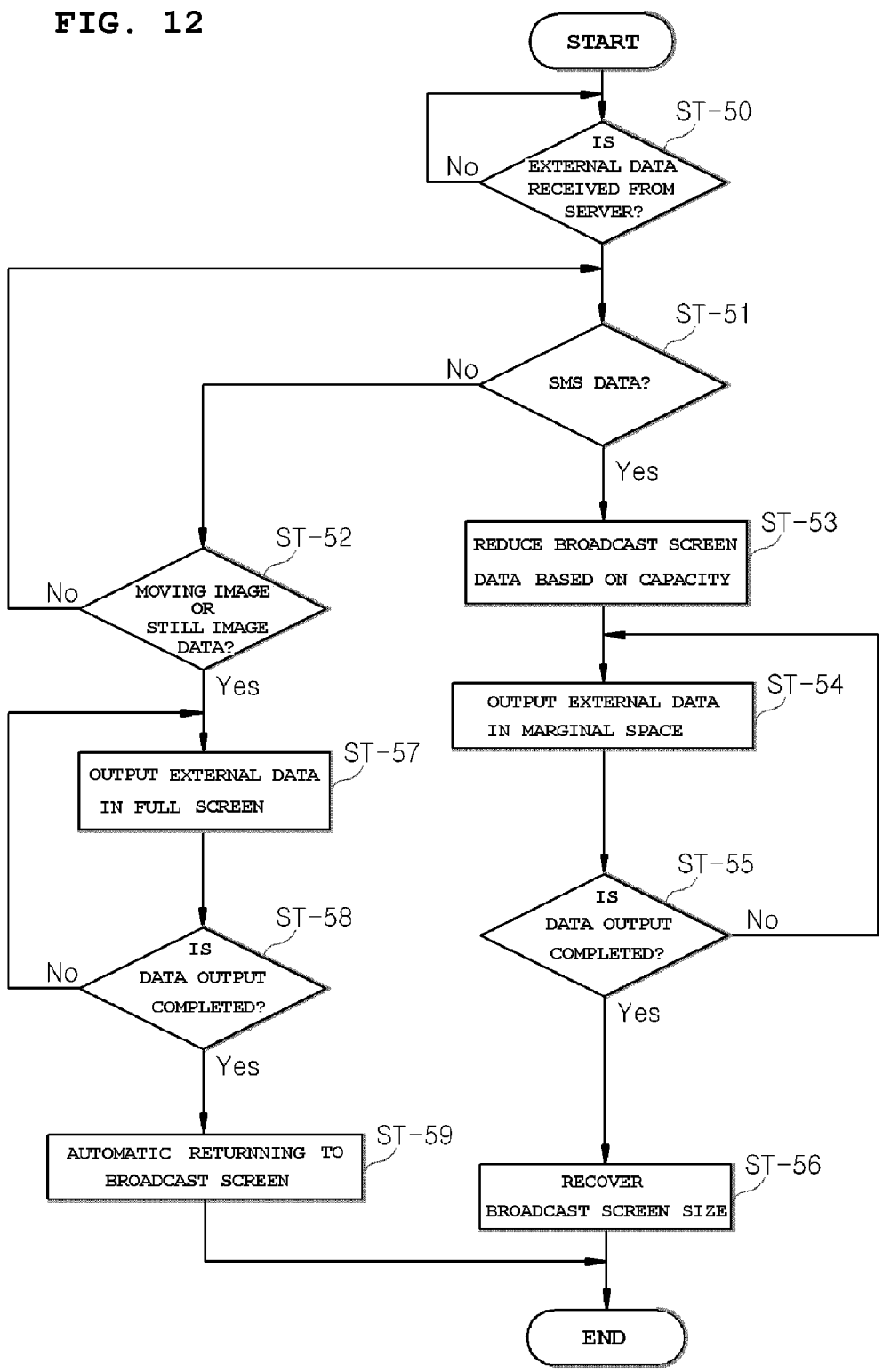
FIG. 12 is a flow chart describing a signal flow of the system for interfacing external data to IPTV in accordance with the third embodiment of the present invention.

FIG. 12 is a flow chart describing a signal flow of the system for interfacing external data to IPTV in accordance with the third embodiment of the present invention.

First, in the system of the present invention, when the STB 4" receives external data transmitted from the external data transmission server 10, the STB 4" judges whether the external data is associated with a short message (SMS)(ST-51 and ST-42).

If it is judged by the STB 4" that the type of the external data is the short message, the STB 4" reduces broadcast screen data suitably for the capacity of the short message (ST-53).

This reduction information about broadcast screen by capacity has been already stored in the STB 4". It is preferable that the broadcast screen data as a short message is reduced in proportional to the number of words. For example, if the number of words is large, the broadcast screen data is reduced a lot and, on the contrary, if the number of words is small, the broadcast screen data is reduced a bit. By making the external data outputted in a marginal portion of the broadcast screen data, the external data can be outputted without disturbing output of the broadcast screen data (ST-54).

Therefore, the STB 4" judges whether the output of the external data is completed (ST-55) and, if so, it generates and provides the screen size controller 35 with a control signal to recover the screen of the broadcast data to the original size (ST-56).

On the other hand, if the received external data is not a text message but moving image or still image data (ST-52), the STB 4" records the broadcast data being outputted on the PVR 6 after switching it to a recording mode, followed by outputting the external data onto the entire screen (ST-57).

In this case, the screen switch 34 of the STB 4" is activated to switch the screen. In that state, the STB 4" judges whether the output of the external data is completed (ST-58) and, if so, it generates and provides the screen size controller 35 with a control signal to recover the screen of the broadcast data to the original size.

Hereinafter, a fourth embodiment of the present invention will be described in detail with reference to the accompanying drawings.

Figure 13:
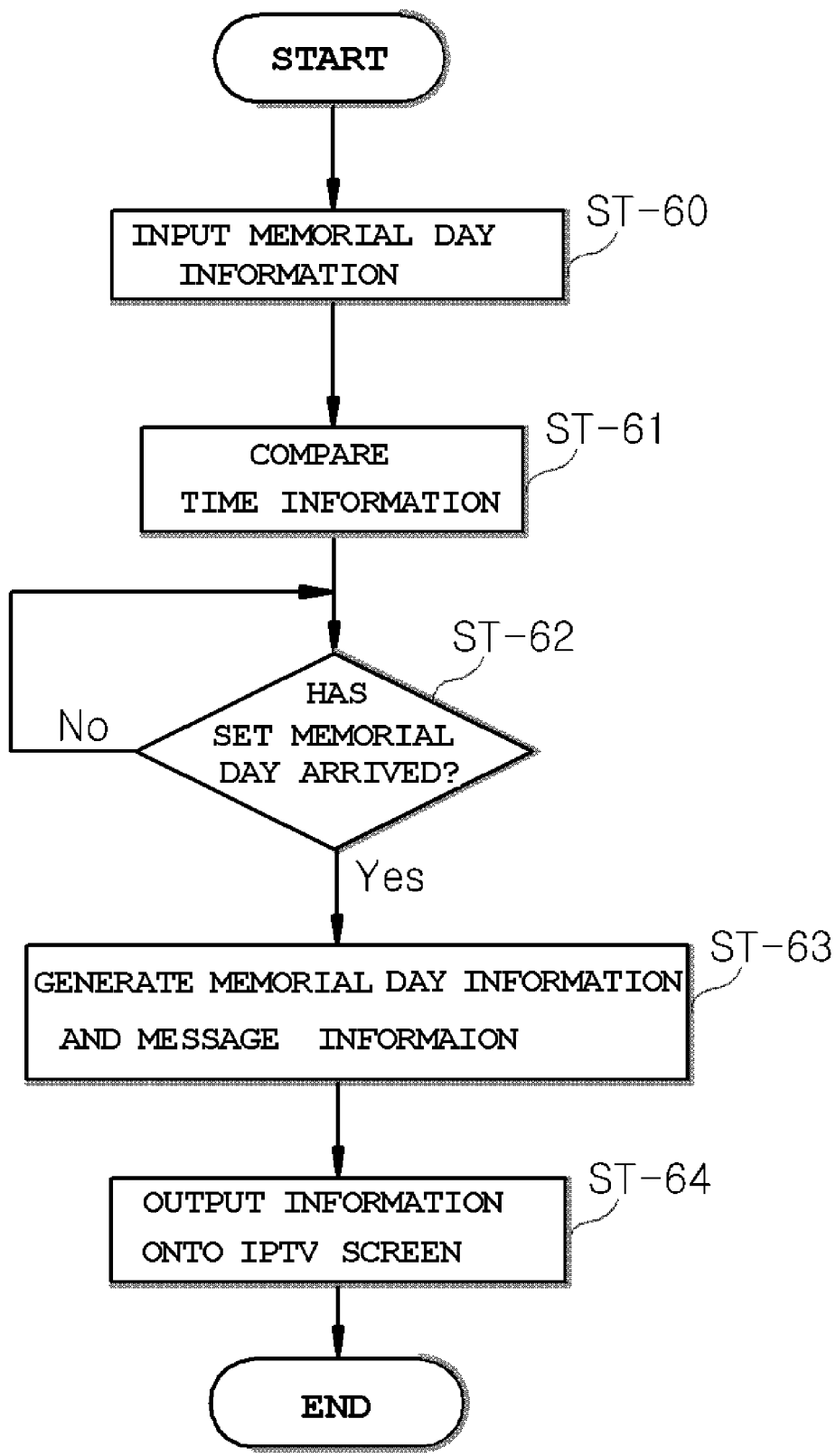
FIG. 13 is a flow chart describing a signal flow of the system for interfacing external data to IPTV in accordance with the fourth embodiment of the present invention.

FIG. 13 is a flow chart describing a signal flow of the system for interfacing external data to IPTV in accordance with the fourth embodiment of the present invention.

First, the system of the present invention, which controls the STB 4 to make reservations on external data for its output, registers unique numbers of mobile phones and IPTVs in conjunction with the external data transmission server 10, and transmits information about a particular memorial day to IPTV at a predetermined time according to user's setting for its output.

First, the system of the present invention allows the STB 4 to receive and store information on a particular memorial day and external data (ST-60).

At this time, a process in which the STB 4 receives and stores the information on a particular memorial day and external data may download and input data through an external terminal (not shown) via a separate port of the STB 4, through the Internet network via the external data transmission server 10, or directly from the mail server, the mobile communication company's server 14, the SMS server, or the sender's PC 16 through the Internet network.

At this time, if data is downloaded through the Internet network, such download will be made accurately, only when the unique number (e.g., IP) of the STB 4 is inputted.

If the input of data is completed in the STB 4, the STB 4 counts a time and compares it with the pre-stored memorial day information to judge whether the memorial day has arrived (ST-62).

If the memorial day has arrived, the STB 4 extracts the memorial day information and pre-stored congratulation message information as the external data and outputs them through the IPTV 2 (ST-63 and ST-64).

Hereinafter, a fifth embodiment of the present invention will be described in detail with reference to the accompanying drawings.

Figure 14:
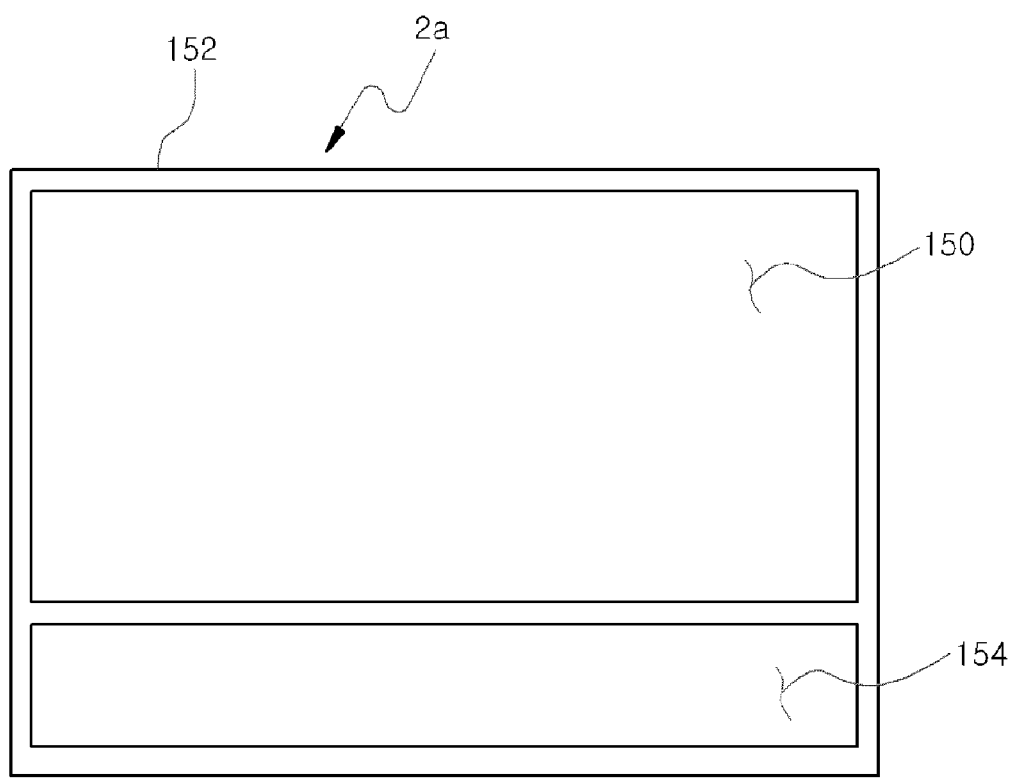
FIG. 14 is a view showing a screen region being outputted on the IPTV through the system for interfacing external data to IPTV in accordance with the fifth embodiment of the present invention.
Figure 15:
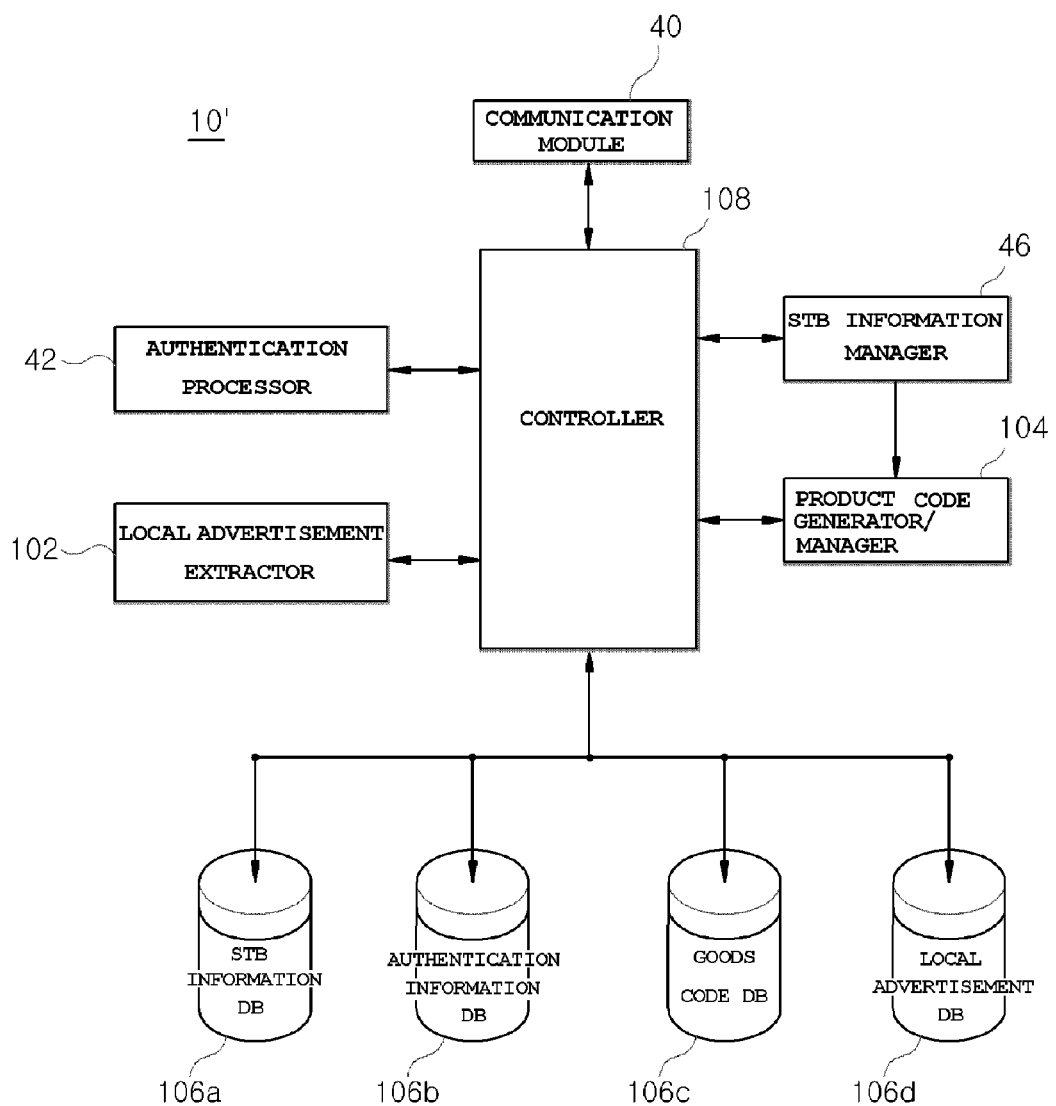
FIG. 15 is a block diagram showing the configuration of an external data transmission server included in the system for interfacing external data to IPTV in accordance with the fifth embodiment of the present invention.

FIG. 14 is a view showing a screen area being outputted onto IPTV through a system for interfacing external data to IPTV in accordance with a fifth embodiment of the present invention, and FIG. 15 is a block diagram showing the configuration of an external data transmission server included in the system for interfacing external data to IPTV in accordance with the fifth embodiment of the present invention.

Referring to the drawings, the system of the present invention is a system that includes goods code information within scene information of broadcast data and transmits matching local advertisement data that is obtained by using the goods code information and local information of IPTV for its output so that the broadcast scene matches the contents of local advertisement.

That is, the system of the present invention can output additional advertisement data consisting of a text message, text/still image data or text/moving image data on a lower side of the broadcast output screen depending on user's setting.

When such additional advertisement data is outputted onto the screen, a goods code is contained in each scene of broadcast data to output additional advertisement data associated with the broadcast data being outputted onto the screen, and then transmitted to the STB 4.

Also the STB 4 can continuously receive additional advertisement data from the external data transmission server 10' depending on user's setting and output it onto the screen, wherein the additional advertisement data is preferably local advertisement. Therefore, the system for interfacing the external data to IPTV in accordance with the fifth embodiment of the present invention allows additional local advertisement data associated with the broadcast data being outputted onto the screen to be outputted on the lower side of the broadcast data.

For this, there is a broadcast data output area 150 where broadcast data is outputted onto a screen 152 of the IPTV 2 in FIG. 14. And an additional advertisement data output area 154 is provided on the lower side of the broadcast data output area 150.

Goods code information should be included in each scene of broadcast data, and therefore, the broadcast data transmission server 8 providing broadcast data performs a task of inputting goods code of each scene in the broadcast data. And, it is designed in a manner that the goods code and goods information for each code are provided to an external data transmission server 10'.

Referring now to FIG. 15, FIG. 15 is a block diagram showing the configuration of the external data transmission server 10' included in the system for interfacing external data to IPTV in accordance with the fifth embodiment of the present invention. The external data transmission server 10' is constituted by a communication module 40, an authentication processor 42, a local advertisement extractor 102, an STB information manager 46, a goods code generator/manager 104, an STB information DB 106a, an authentication information DB 106b, a goods code DB 106c, a local advertisement DB 106d, and a controller 108.

The communication module 40 serves to perform data communications between the STB 4 provided at each home and an advertiser's PC (not shown) and the broadcast data transmission server 8.

The authentication processor 42 receives and registers unique numbers and a request signal for local advertisement reception transmitted from the STB 4, and authenticates a user or the STB 4 that desires to receive local advertisement data transmitted from the advertiser's PC.

The local advertisement extractor 102 performs a routine that extracts local advertisement pre-classified depending on goods codes transmitted from the STB 4, and the STB information manager 46 manages unique numbers given to all STBs including the STB 4 and classifies the unique numbers by regions.

The goods code generator/manager 104 generates goods codes by goods information to be inserted into the broadcast data.

The STB information DB 106a stores the unique numbers given to all STBs including the STB 4, and the authentication information DB 106b stores authentication information related to a user or the STB 4 preset to receive additional local advertisement. The goods code DB 106c stores goods codes by goods information to be inserted into the broadcast data, and the local advertisement DB 106d stores local advertisement data.

The controller 50 controls the operations that receive a request signal for local advertisement reception and authentication information from a receiver that is a user of the STB 4 and register them in advance, and receives and stores local advertisement data from the advertiser's terminal (not shown). It also controls the operations that generate each goods code and inserts goods code matching goods advertisement by scene of the broadcast data into the broadcast data, and extract matching additional local advertisement data depending on goods code and STB unique number transmitted from each STB 4 and transmit it to the STB 4.

Now, the functions and operations of the system for interfacing the external data to IPTV in accordance with the fifth embodiment of the present invention will be described in detail with reference to the accompanying drawings.

Figure 16:
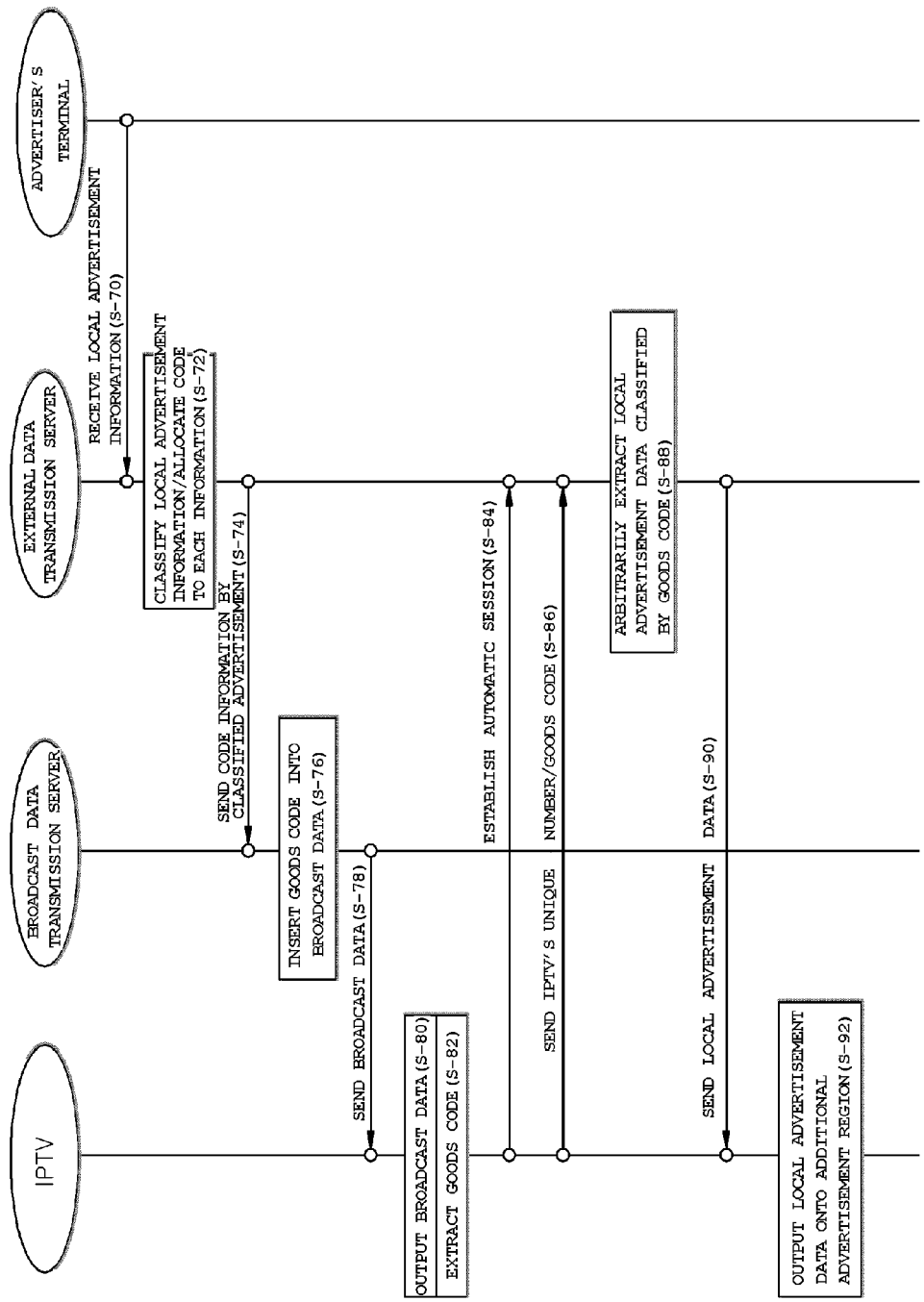
FIG. 16 is a flow chart describing an overall signal flow of the system for interfacing the external data to IPTV in accordance with the fifth embodiment of the present invention.

FIG. 16 is a flow chart describing an overall signal flow of the system for interfacing the external data to IPTV in accordance with the fifth embodiment of the present invention.

First, in the system of the present invention, the external data transmission server 10' receives advertisement data and local information desiring the output of advertisement of a corresponding advertisement company from plural advertisers' terminals (not shown) and classifies the local advertisement data by region and allocates a local code thereto (S-70, S-72).

Next, the external data transmission server 10' allocates classification code information to each goods desiring the output of advertisement and stores it.

In this state, the external data transmission server 10' transmits the code information allocated to each goods to the broadcast data transmission server 8 (S-74). For example, if a goods is furniture, it transmits F-100 as the code information to the broadcast data transmission server 8, and if a goods is automobile, it transmits C-001 as the code information to the broadcast data transmission server 8.

Then, the broadcast data transmission server 8 inserts the goods classification code into the broadcast data packet (S-76), and transmits the broadcast data to the STB 4 for its output onto the screen of the IPTV 2 (S-80).

At this time, the STB 4 extracts goods classification code from the broadcast data, establishes an automatic session for the external data transmission server 10' and transmits a unique number of IPTV or STB and goods classification code (S-82 and S-84).

Then, the external data transmission server 10' arbitrarily extracts local advertisement data that belongs to the corresponding location and to the corresponding goods group by using the goods classification code and local code corresponding to the IPTV's unique number (S-88).

Next, the external data transmission server 10' transmits the local advertisement data to the STB 4 and outputs it onto the screen of the IPTV 2 (S-90).

Through this, when there is the appearance of automobile on the broadcast scene being outputted onto the screen through the broadcast data, the IPTV 2 outputs, as an additional advertisement, local automobile store or store information, which is local advertisement, from the external data transmission server 10' (S-92). At this time, there is no problem although the automobile being outputted as the broadcast data and automobile being outputted as the local advertisement data are different in kind from each other.

Therefore, in case where a particular goods is outputted as a scene of broadcast data, the system of the present invention can output local advertisement data that belongs to the same kind as the goods as an additional advertisement on a lower side of the broadcast data. Thus, the system of the present invention has an advertisement effect similar to an advertisement through broadcast data at lower costs. In addition, advertisement of a local company to which the IPTV belongs to is outputted, thereby getting more effects.

As mentioned above, in case where a particular goods is outputted on a broadcast screen, the system of the present invention can automatically output local advertisement data that belongs to the goods group as an additional advertisement so as to enhance advertisement effects.

Preferably, automatic order information is contained in the additional local advertisement data to make an automatic goods order by key manipulation of the remocon of the IPTV 2, and when there is a request for automatic order through the IPTV 2, it may be implemented that the order data can be transmitted to a corresponding advertiser through the external data transmission server 10'.

Meanwhile, the system and method for interfacing external data to IPTV in accordance with the present invention is not limited to the particular embodiments described above, but it will be apparent to those skilled in the art that various changes or modifications may be made without departing the scope of the invention as defined in the following claims.

What is claimed is:

1. A system for interfacing external data to an IPTV, the system comprising:
    a broadcast data transmission server for transmitting broadcast data to a STB (Set-Top Box) provided at each home over a broadcast access network, wherein the STB is configured to register a STB's unique number and a receiver's mobile phone number in a remote external data transmission server, and to store external data transmitted from the remote external data transmission server and to switch automatically a screen to output the external data onto the screen during the output of broadcast data transmitted from the broadcast data transmission server and being outputted onto the screen;
    an authentication processor which receives and registers the unique number and sender's authentication information transmitted from the STB;
    an authentication information DB for storing authentication information of the receiver that receives the external data established in conjunction with the unique number of the STB;
    a sender registration information DB for registering and storing allowable sender's unique number by the receiver in advance so that the external data can be sent to the particular STB; and
    a screen control information DB for storing screen control data for switching a PVR to the recording mode that records the broadcast data being outputted onto the screen of the PVR connected to the STB, turning on the PVR, and switching the screen to the external data for its output,
    wherein the external data transmission server configured for receiving the receiver's mobile phone number information and the STB's unique number information from the STB and for registering the received information in advance in conjunction with each other is configured to register the received information in a mobile communication company's server including a SMS server and a sender's PC, and to receive the external data containing at least one of text data, moving image and still image data through the receiver's mobile phone or the STB's unique number, and to transmit the external data to the STB,
    wherein the external data transmission server is configured to receive particular sender's phone number information and prevent data transmitted from the sender's phone number from being transmitted to the STB, and
    wherein, when the external data from the external data transmission server is to be outputted, the STB is configured to judge whether the broadcast data is being outputted and, if the broadcast data is being outputted through the IPTV, automatically record the broadcast data on the PVR and output the received external data onto the screen after screen switching.

2. The system of claim 1, wherein the external data transmission server is configured to receive and register no-authentication sender's phone number information from the STB, and selectively perform an authentication process through a comparison between the sender's phone number information and the no-authentication sender's phone number information upon receipt of the external data.

3. The system of claim 1, wherein the external data transmission server is designed to establish in advance a route in that the external data from an external server including a mail server, a mobile communication company's server and the SMS server is transmitted to at least one of a mobile phone, a particular email URL and the IPTV to automatically transmit the external data following the established route.

4. The system of claim 1, wherein the STB includes: a communication interface, connected to the broadcast data transmission server and the external data transmission server over a broadcast access network or Internet network, for performing data communications between them and protocol matching and filtering operations;
 a remocon information receiver for generating a request signal for interfacing received data from the viewer's mobile phone to the IPTV, and for receiving a remocon signal associated with the receiver's phone number information and no-authentication sender's phone number information, and an authentication information input signal;
 a broadcast output controller for receiving digital broadcast data from the broadcast data transmission server and controlling the output of the data through the IPTV;
 an external data output controller for controlling the output of the external data consisting of at least one of a moving image, still image and text data from the external data transmission server onto the screen of the IPTV;
 a broadcast data recording controller for controlling a PVR to record the broadcast data that is being outputted during an output time of the external data by switching the PVR to a recording mode;
 a screen switch which operates in conjunction with the broadcast data recording controller and controls the operation of switching the screen from the broadcast data being outputted through the IPTV to the external data;
 a data storage memory for storing the external data transmitted from the external data transmission server, as well as authentication password information pre-registered by viewers, the STB's unique number, and a control routine for screen switching; and
 a controller for controlling the operations that receive the interface request signal from the remocon information receiver, the receiver's mobile phone number information and no-authentication sender's phone number information, and an authentication information input signal and store the received information as authentication information, transmit the interface request signal, the receiver's mobile phone number information and no-authentication sender's phone number information and the STB's unique number to the data transmission server, and perform an authentication process upon receipt of the external data and output the external data onto the screen of the IPTV after screen switching from the broadcast data to the recording mode.

5. The system of claim 4, wherein the screen switching control routine stored in the data storage memory is programmed in advance to output the external data onto the screen while automatically recording the broadcast data on the PVR at a time when the external data is to be outputted.

6. The system of claim 1, wherein the external data transmission server includes:
 a communication interface for performing data communications between the STB provided at each home and the sender's PC and the mobile communication company's server; an authentication processor which receives and registers the unique number and sender's authentication information transmitted from the STB, and authenticates a sender who transmits a short message, still image data, moving image data through the sender's PC or the mobile communication company's server to confirm whether the sender is a sender allowed for data transmission by a receiver in advance;
 a screen control information generator which generates screen control data for switching a PVR to a recording mode that records the broadcast data being outputted onto the screen of the PVR connected to the STB, turning on the PVR, and switching the screen to the external data for its output;
 a STB information manager for managing unique numbers allocated to all STBs including the STB;
 a STB information DB for storing the unique numbers allocated to all STBs including the STB;
and
 a controller for controlling the operations that receive and register sender's authentication information in advance from the receiver that is a user of the STB and, connected with the mobile communication company's server and the sender's PC, for controlling the operations that authenticate a sender of external data received over the Internet network, and transmit the external data to the STB upon completion of authentication to output the external data onto the IPTV.

* * * * *